(12) United States Patent
Bolin et al.

(10) Patent No.: US 8,926,238 B1
(45) Date of Patent: Jan. 6, 2015

(54) CUTTING TOOL SLEEVE FOR TOOL HOLDERS

(75) Inventors: Jared Lee Bolin, Millstadt, IL (US); Ryan Lee Hanks, Shipman, IL (US)

(73) Assignee: The Boeing Company, Chicago, IL (US)

( * ) Notice: Subject to any disclaimer, the term of this patent is extended or adjusted under 35 U.S.C. 154(b) by 722 days.

(21) Appl. No.: 12/772,637

(22) Filed: May 3, 2010

Related U.S. Application Data

(63) Continuation-in-part of application No. 12/568,877, filed on Sep. 29, 2009, now Pat. No. 8,821,082.

(51) Int. Cl.
*B23C 5/00* (2006.01)

(52) U.S. Cl.
CPC .................................... *B23C 5/00* (2013.01)
USPC ............................. 409/132; 409/234; 408/143

(58) Field of Classification Search
USPC ............. 409/132, 141, 234; 408/143; 407/66, 407/102; 82/1.11
IPC ........................................................ B23B 29/02
See application file for complete search history.

(56) References Cited

U.S. PATENT DOCUMENTS

| | | | |
|---|---|---|---|
| 3,230,833 A * | 1/1966 | Shurtliff | 409/141 |
| 4,998,851 A | 3/1991 | Hunt | |
| 5,000,631 A | 3/1991 | Deutschenbaur et al. | |
| 5,311,654 A | 5/1994 | Cook | |
| 5,593,258 A | 1/1997 | Matsumoto et al. | |
| 5,775,857 A | 7/1998 | Johne | |
| 6,280,126 B1 | 8/2001 | Slocum et al. | |
| 6,511,265 B1 * | 1/2003 | Mirchandani et al. | 407/53 |
| 7,270,506 B2 * | 9/2007 | Guy et al. | 409/234 |
| 2006/0288820 A1 * | 12/2006 | Mirchandani et al. | 76/108.1 |
| 2007/0081873 A1 * | 4/2007 | Blomstedt et al. | 409/234 |
| 2008/0170917 A1 * | 7/2008 | Hilker | 407/54 |
| 2008/0226401 A1 | 9/2008 | Hoefler et al. | |
| 2009/0003947 A1 | 1/2009 | Haimer et al. | |

FOREIGN PATENT DOCUMENTS

| | | | | |
|---|---|---|---|---|
| DE | 3409581 | | 9/1984 | |
| DE | 3409591 A | * | 9/1985 | B24B 45/00 |
| JP | 59169707 A | * | 9/1984 | B23B 51/02 |
| JP | 59187407 A | * | 10/1984 | B23B 51/02 |

(Continued)

OTHER PUBLICATIONS

Bolin et al., "Stiffening Sleeve for Tool Holder", U.S. Appl. No. 12/568,877, filed Sep. 29, 2009, 46 pages.

(Continued)

*Primary Examiner* — Daniel Howell
*Assistant Examiner* — Michael Vitale
(74) *Attorney, Agent, or Firm* — Yee & Associates, P.C.

(57) ABSTRACT

A method and apparatus may be provided for performing an operation on a workpiece. A tool holder with a tool and the workpiece may be positioned relative to each other. The tool holder may be attached to a machine. The tool may have a sleeve and a number of cutting features. The sleeve may have a first end, a second end, a surface, and a channel with an opening at the first end of the sleeve and an opening at the second end of the sleeve. The sleeve may receive at least a portion of a rod for the tool holder in the channel. A stiffness of the sleeve may be greater than a stiffness of the tool holder. The number of cutting features may be associated with the surface of the sleeve. The operation may be performed using the tool holder with the tool on the workpiece.

19 Claims, 15 Drawing Sheets

(56) References Cited

FOREIGN PATENT DOCUMENTS

| JP | 61226231 | A | * | 10/1986 | ............. B23P 15/32 |
| JP | 03073210 | A | * | 3/1991 | ............... B23C 5/18 |
| JP | 05092329 | A | * | 4/1993 | ............. B23P 15/32 |
| JP | 06031505 | A | * | 2/1994 | |
| JP | 2004338079 | | | 12/2004 | |
| WO | WO2006050952 | | | 5/2006 | |

OTHER PUBLICATIONS

Office Action for U.S. Appl. No. 12/568,877 dated Dec. 14, 2012, 10 pages.

Office Action dated Jan. 14, 2014, regarding U.S. Appl. No. 12/568,877, 9 pages.

* cited by examiner

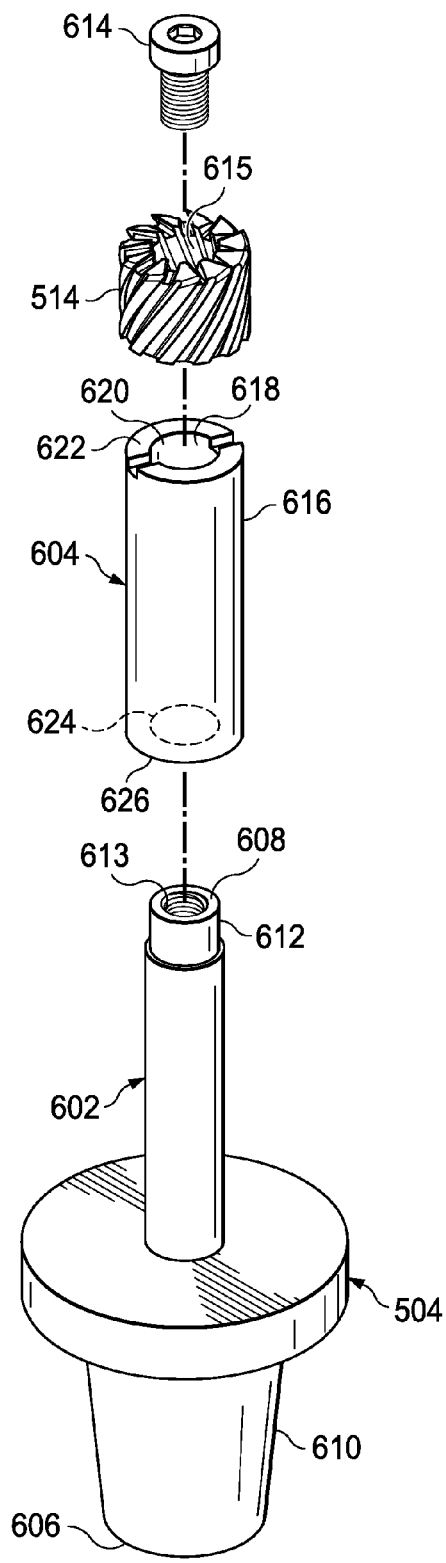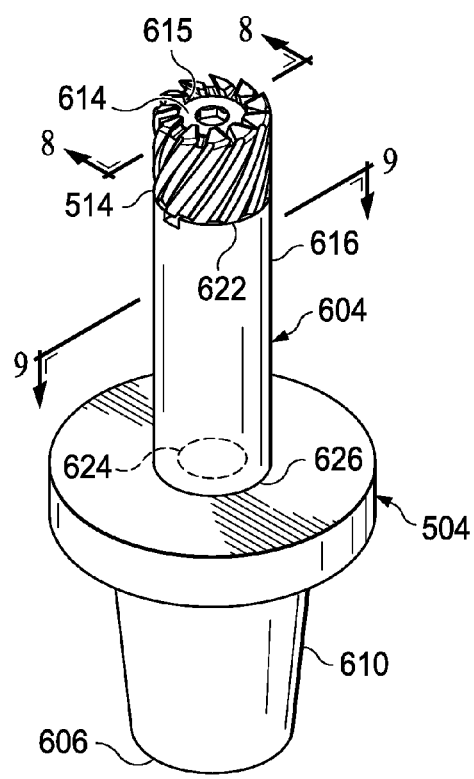
FIG. 6
FIG. 7

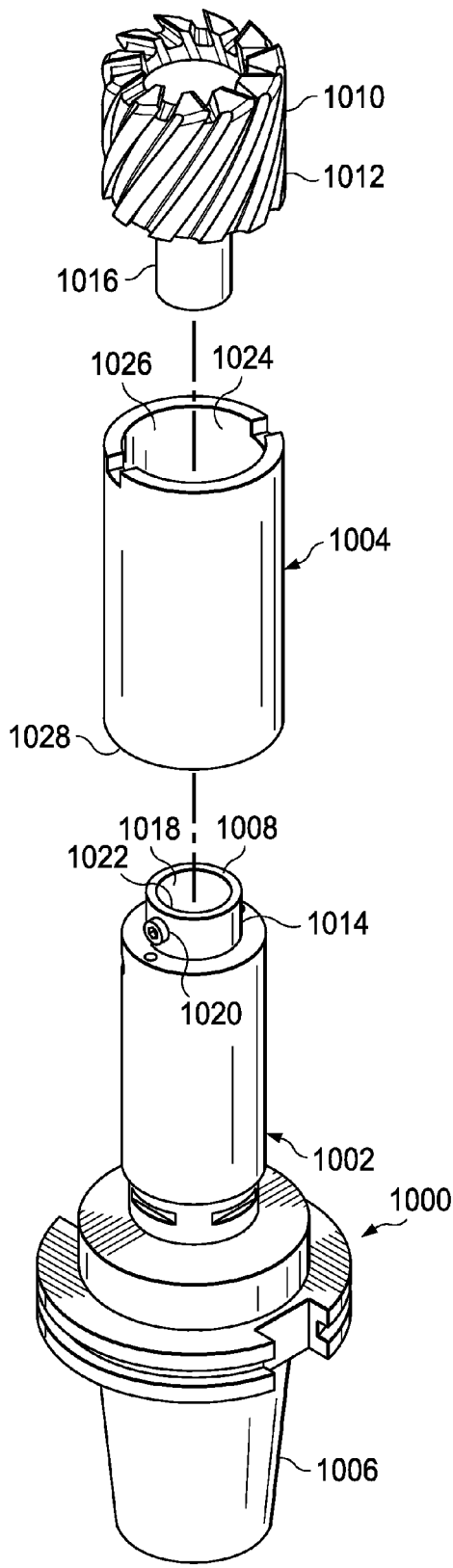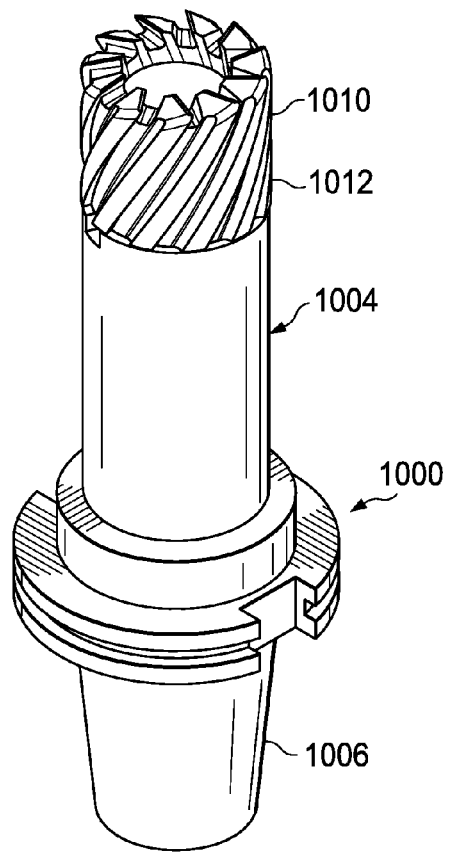
FIG. 10
FIG. 11

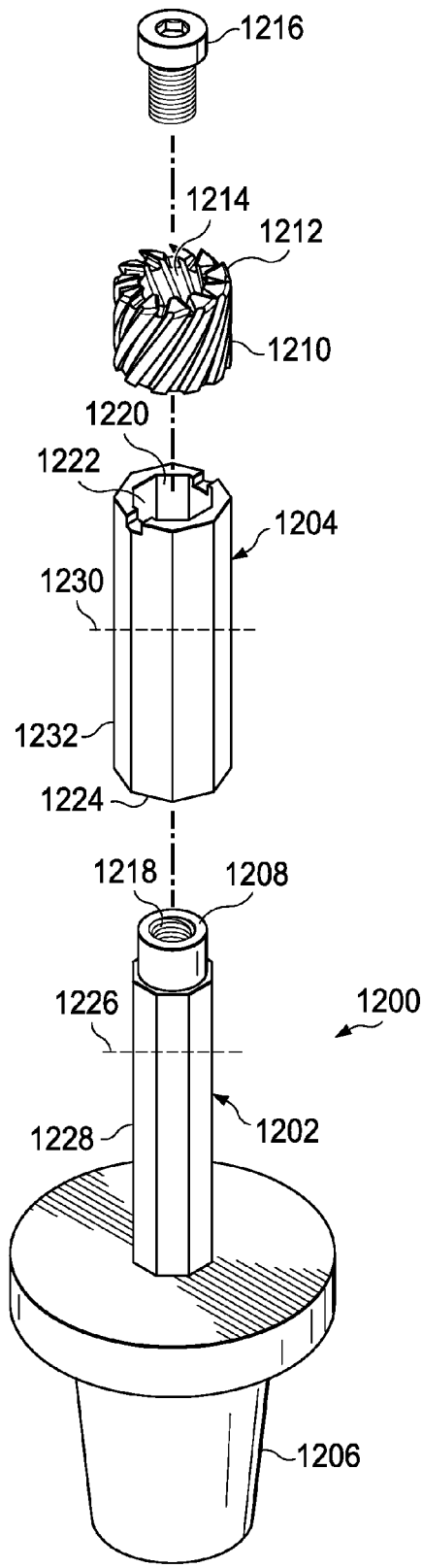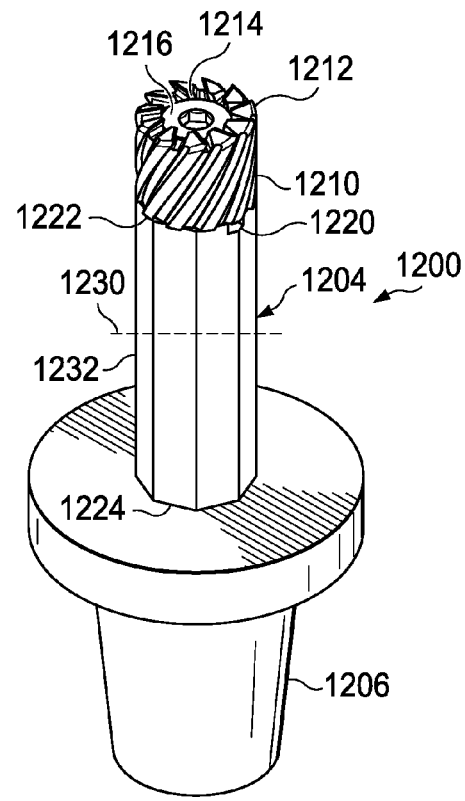
FIG. 12
FIG. 13

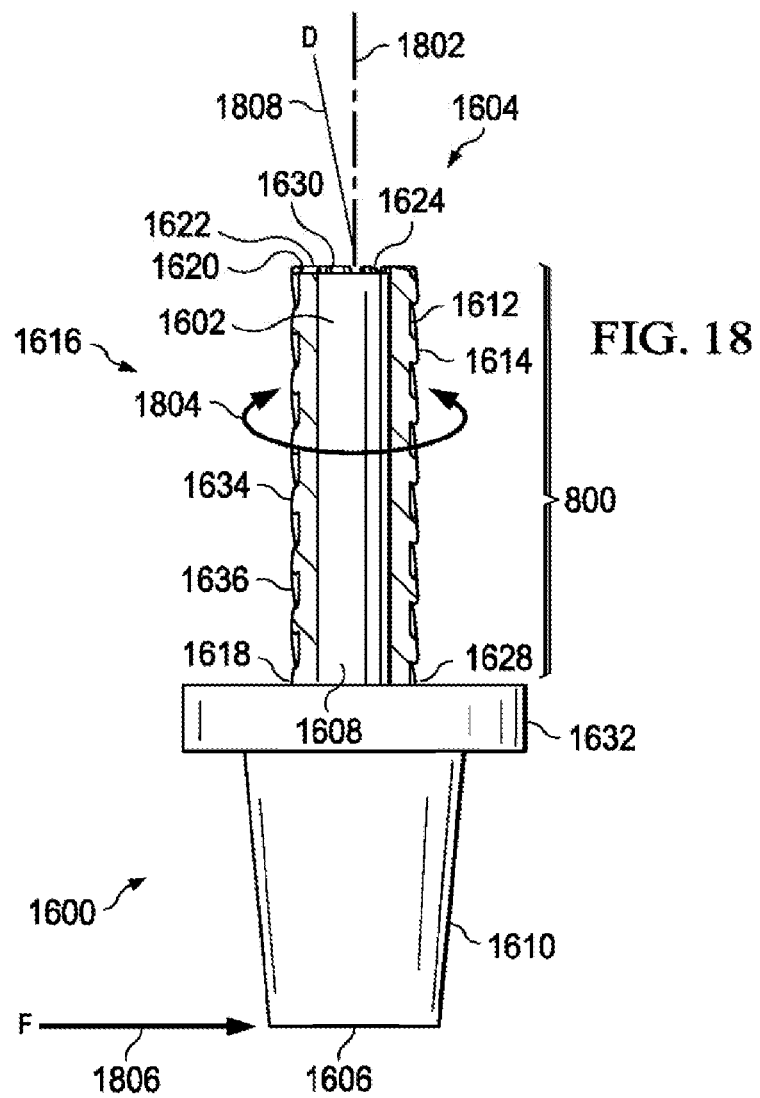
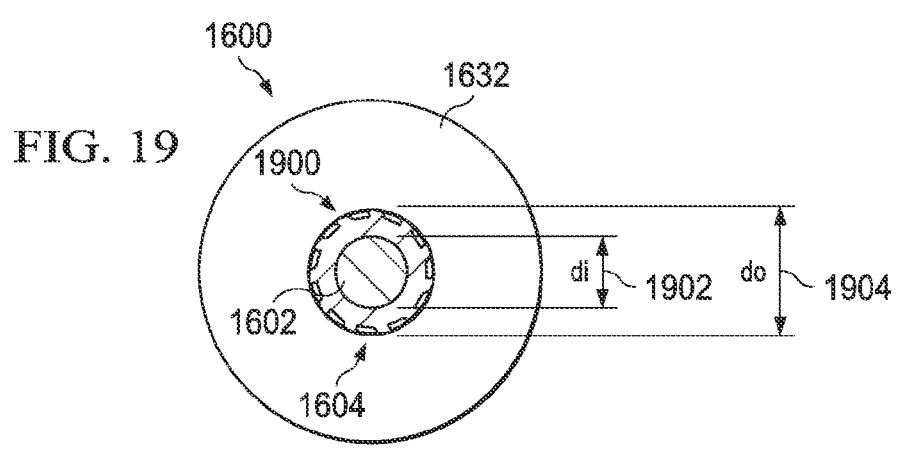

CUTTING TOOL SLEEVE FOR TOOL HOLDERS

CROSS-REFERENCE TO RELATED APPLICATION

This application is a continuation-in-part (CIP) of and claims priority to the following patent application entitled: "Stiffening Sleeve for Tool Holders", Ser. No. 12/568,877, filed Sep. 29, 2009, and is incorporated herein by reference.

BACKGROUND INFORMATION

1. Field

The present disclosure relates generally to fabricating parts and, in particular, to a method and apparatus for performing machining operations on a workpiece for fabricating a part.

2. Background

In fabricating parts, machines may be used to perform operations on workpieces to form the parts. One type of operation performed on the workpieces may be machining. Machining may involve removing materials from a workpiece. Machining may be typically performed to selectively remove metal. Machining also may be performed for other types of materials, such as plastics or composite materials. Machining may include, for example, without limitation, drilling, milling, shaping, planing, boring, broaching, sawing, burnishing, and/or other similar types of operations. Machines used to perform these types of operations may include, for example, without limitation, a lathe, a milling machine, a drill press, and/or other suitable types of devices.

When performing a machining operation on a workpiece, the machine may employ a cutting tool, such as a cutter. The cutter may have one or more sharp edges and may be made of material that is harder than the material in the workpiece. The cutter on a machine may be secured to a tool holder. The tool holder may then be secured to a spindle and/or other component of a milling machine. The tool may have various lengths, depending on the particular operation that may be performed. For example, without limitation, if the milling operation is to be performed through the entire thickness of a workpiece, the tool may have a length that allows the cutter to reach through the thickness of the workpiece. As the workpiece increases in thickness, the length of the tool may be increased to allow the cutter to reach through the entire thickness of the workpiece.

As the length of a tool increases, the flexibility of the tool increases. An increase in flexibility means that the tool may be displaced or deflected during a machining operation from an axis extending through the tool. In other words, the stiffness of the tool may decrease. The displacement of the tool may cause undesirable finishes in the surface of the tool. A poor surface finish may be referred to as chatter. Chatter may result in an undulating and/or irregular finish on the surface of the workpiece.

With surface finishes having chatter and/or other types of undesirable surface finishes, a part may not meet tolerances and/or may not have the desired aesthetics. As a result, the part may require reworking and/or may be scrapped. Consequently, additional time and expense may be incurred in fabricating parts.

Therefore, it would be advantageous to have a method and apparatus that takes into account at least some of the issues described above, as well as other possible issues.

SUMMARY

In one advantageous embodiment, an apparatus may comprise a sleeve and a number of cutting features associated with the surface of the sleeve. The sleeve may have a first end, a second end, a surface, and a channel with a first opening for the channel at the first end of the sleeve and a second opening for the channel at the second end of the sleeve. The sleeve may be configured to receive at least a portion of a tool holder in the channel. The tool holder may have a first stiffness, and the sleeve may have a second stiffness. The second stiffness may be greater than the first stiffness.

In another advantageous embodiment, a tool system may comprise a sleeve, a tool holder, a tool, and a number of cutting features associated with a surface of the sleeve. The sleeve may have a first end, a second end, a surface, and a channel with a first opening for the channel at the first end of the sleeve and a second opening for the channel at the second end of the sleeve. The sleeve may have a cross section with a shape selected from one of a circle, an octagon, a hexagon, and an ellipse. The sleeve may be configured to receive at least a portion of a tool holder in the channel. The tool holder may have a first stiffness, and the sleeve may have a second stiffness in which the second stiffness may be greater than the first stiffness. The sleeve may be comprised of a material selected from a group comprised of a carbide having metallic properties, titanium carbide, tungsten carbide, titanium, zirconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, rhondium, a ceramic material, calcium carbide, silicon carbide, a tungsten alloy, osmium, diamond, a rhenium alloy, molybdenum, and composite materials. The tool holder may have the first stiffness and may be configured for use with a machine selected from one of a milling machine and a lathe. The tool holder may comprise a rod, a first interface, and a second interface. The rod may have a first end and a second end and may have the first stiffness. The rod may be comprised of steel. The sleeve may be configured to be associated with the rod using one of an interference fit and an adhesive. An overall stiffness for the rod in the channel of the sleeve may be selected as follows:

$$\text{stiffness} = 3(E1 I1 + E2 I2)/L^3,$$

where $E1$ is Young's modulus for the rod, $E2$ is Young's modulus for the sleeve, $I1$ is a cross-sectional inertia for the rod, $I2$ is a cross-sectional inertia for the sleeve, and $L$ is a length of the rod. The first interface may be at the first end of the rod and may be configured for attachment to the machine. The second interface may be at the second end of the rod and may be configured to hold a tool. The number of cutting features may be selected from one of a number of flutes and a number of curved edges formed on the surface of the sleeve. The number of curved edges may extend from the first end of the sleeve to the second end of the sleeve. The number of cutting features may have a spiral configuration.

In yet another advantageous embodiment, a method may be provided for performing an operation on a workpiece. A tool holder with a tool and the workpiece may be positioned relative to each other in which the tool holder may be attached to a machine. The tool may have a sleeve and a number of cutting features. The sleeve may have a first end, a second send, a surface, and a channel with a first opening for the channel at the first end of the sleeve and a second opening for the channel at the second end of the sleeve. The sleeve may be configured to receive at least a portion of a rod for the tool holder in the channel. The tool holder may have a first stiffness, and the sleeve may have a second stiffness in which the second stiffness may be greater than the first stiffness. The number of cutting features may be associated with the surface of the sleeve. The operation may be performed using the tool holder with the tool on the workpiece.

In still yet another advantageous embodiment, a method may be provided for performing an operation on a workpiece. A tool holder with a tool and the workpiece may be positioned relative to each other in which the tool holder may be attached to a machine. The tool may have a sleeve and a number of cutting features. The sleeve may have a first end, a second send, a surface, and a channel with a first opening for the channel at the first end of the sleeve and a second opening for the channel at the second end of the sleeve. The number of cutting features may extend from the first end of the sleeve to the second end of the sleeve and may have a spiral configuration. The sleeve may be configured to receive at least a portion of a rod for the tool holder in the channel. The tool holder may have a first stiffness, and the sleeve may have a second stiffness. The second stiffness may be greater than the first stiffness. The number of cutting features may be associated with the surface of the sleeve. The tool holder may comprise a rod, a first interface at the first end of the rod, and a second interface at the second end of the rod. The rod may have a first end, a second end, and the first stiffness. The rod may hold the tool. The first interface may be configured for attachment to the machine. The second interface may be configured to hold the tool. The operation may be performed using the tool holder with the tool on the workpiece. The operation may be performed by rotating at least one of the tool holder with the tool and the workpiece and establishing contact between the tool and the workpiece while rotating at least one of the tool holder with the tool and the workpiece. The operation may be selected from one of a milling operation and a boring operation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 6 is an illustration of an exploded perspective view of a tool holder and a sleeve in accordance with an advantageous embodiment;

FIG. 7 is an illustration of a perspective view of a tool holder with a sleeve in accordance with an advantageous embodiment;

FIG. 10 is an illustration of a perspective view of a tool holder with a sleeve in accordance with an advantageous embodiment;

FIG. 11 is an illustration of a perspective view of a tool holder with a sleeve in accordance with an advantageous embodiment;

FIG. 12 is an illustration of a perspective view of a tool holder with a sleeve in accordance with an advantageous embodiment;

FIG. 13 is an illustration of a perspective view of a tool holder with a sleeve in accordance with an advantageous embodiment;

FIG. 18 is an illustration of a cross-sectional side view of a tool holder with a tool in accordance with an advantageous embodiment;

FIG. 19 is an illustration of a cross-sectional view of a tool holder with a tool in accordance with an advantageous embodiment;

DETAILED DESCRIPTION

Figure 1:
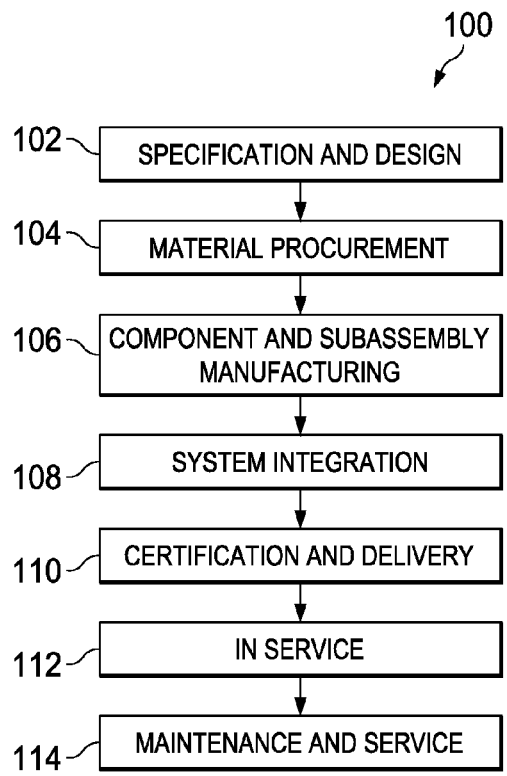
FIG. 1 is an illustration of an aircraft manufacturing and service method in accordance with an advantageous embodiment.
Figure 2:
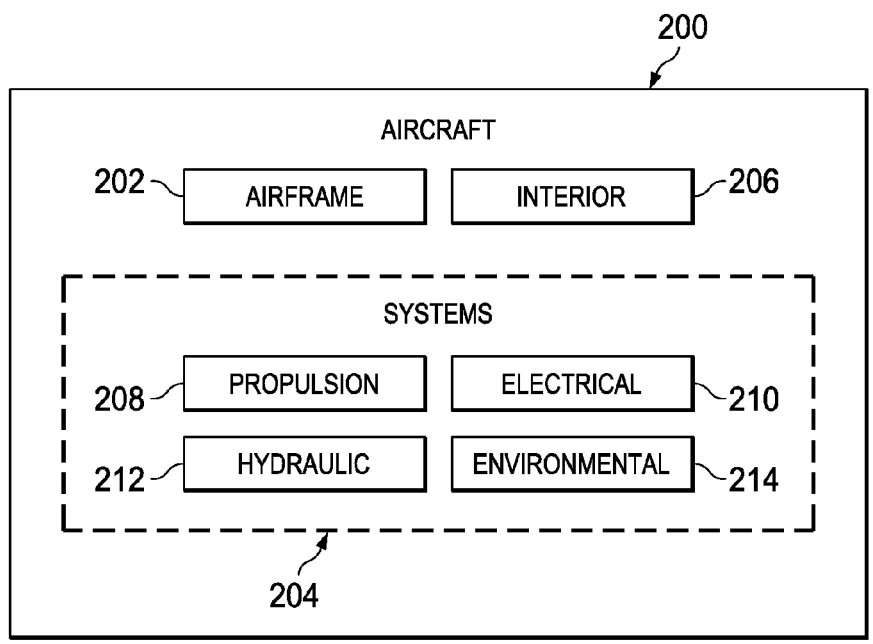
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG.

2 may take place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that tool holders may be made of steel. Steel may be selected as the material because of the cost and strength of this type of material. However, with the use of steel, as the length of the tool holder increases, increased flexing of the tool holder may result in increased deflection of the tool during different operations.

The different advantageous embodiments recognize and take into account that one solution may involve using a carbide tool holder. A carbide tool holder may be comprised of a carbide in which one component may be carbon and a second component may be a less electronegative element. These materials may include, for example, without limitation, titanium carbide, tungsten carbide, and/or other suitable materials. Carbide may be about three to five times stiffer than steel of the same dimensions for a tool holder. As a result, tool holders having a longer length may be used while avoiding undesired finishes or other effects on the workpiece.

Carbides, however, may cost more than tool holders made from steel. As a result, the expense for performing operations on workpieces may be increased with the use of carbide tool holders. In addition, obtaining tools using non-industry standard materials may require longer lead times from tool holder suppliers.

The different advantageous embodiments also recognize and take into account that another solution may involve using tool holders with a larger diameter when the length of the tool holders increases. The increased diameter may decrease the flexing of the tool holder when the length of the tool holder is increased. This solution may be used instead of employing a higher-cost material. However, in some cases, the size of the cutter that may be desired for use in performing the operations may have a smaller diameter than the tool holder with the larger diameter.

The different advantageous embodiments recognize and take into account that yet another solution may involve removing materials from a workpiece using the tool holder at a slower rate. This slower rate may be achieved by, for example, without limitation, a decrease in rotational speed, a decrease in feed rates, or a decrease in the depth of cuts made by the tool. The slower rate may reduce and/or prevent undesirable chatter. This solution, however, may increase the time needed to manufacture parts and structures for platforms, such as aircraft.

Thus, the different advantageous embodiments provide a method and apparatus for a tool holder. In one advantageous embodiment, an apparatus may comprise a tool holder and a sleeve. The tool holder may comprise a rod, a first interface, and a second interface. The rod may have a first end and a second end in which the rod may have a first stiffness. A first interface may be located at the first end, and a second interface may be located at the second end. The first interface may be configured for attachment to a machine, and the second interface may be configured to hold a tool.

The sleeve may have a channel, a first opening at a first end of the channel, and a second opening at a second end of the channel. The sleeve may have a second stiffness in which the channel is configured to receive at least a portion of a rod through the first opening and the second opening.

Figure 3:
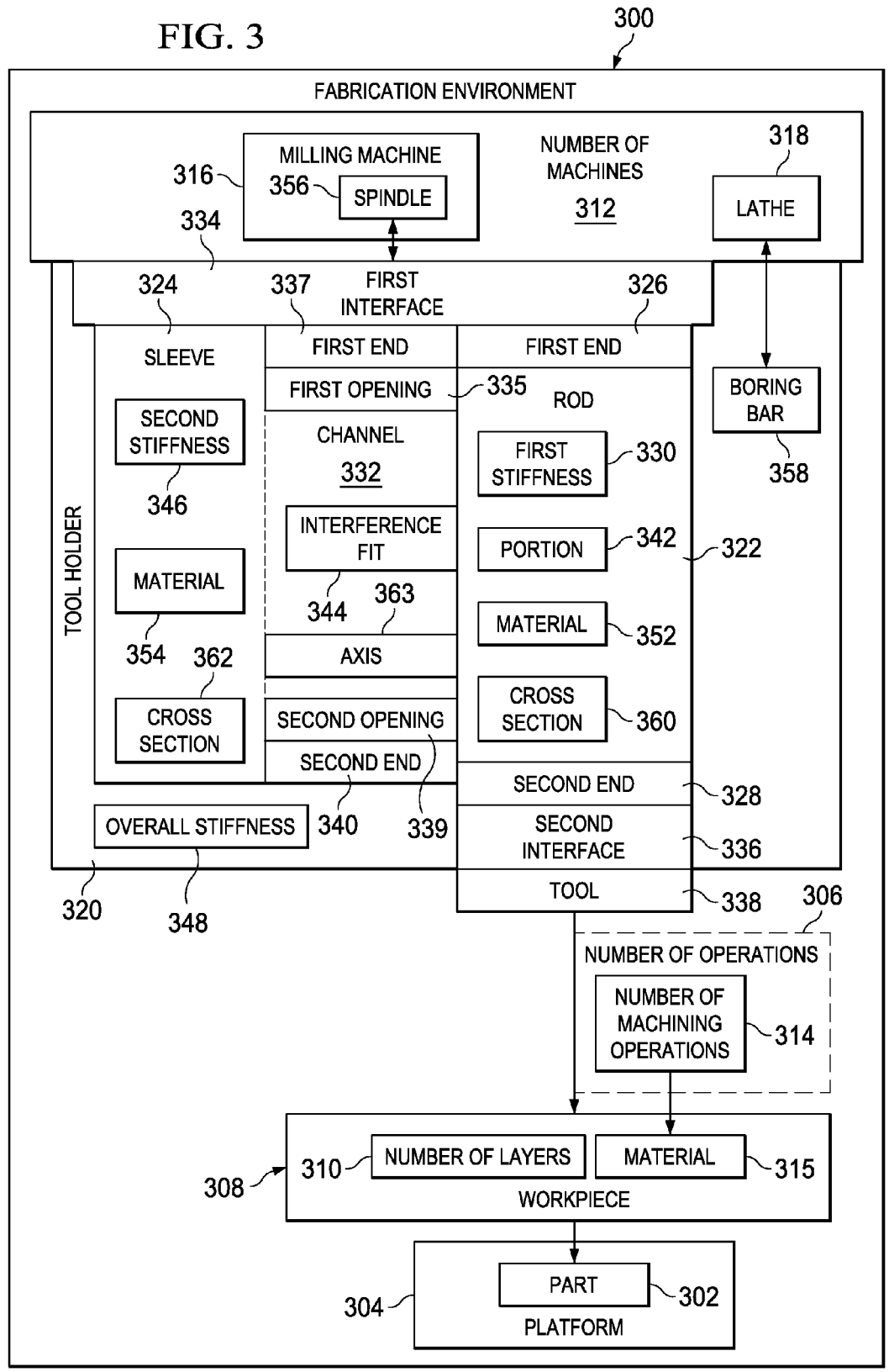
FIG. 3 is an illustration of a fabrication environment in accordance with an advantageous embodiment.

With reference now to FIG. 3, an illustration of a fabrication environment is depicted in accordance with an advantageous embodiment. Fabrication environment 300 is an example of an environment that may be used to manufacture part 302 for platform 304.

In these illustrative examples, platform 304 may be aircraft 200 in FIG. 2. Part 302 may be, for example, without limitation, a rib, a spar, a wing, a vertical stabilizer, a horizontal stabilizer, a support structure, a skin panel, a bracket, or some other suitable type of part. In these illustrative examples, part 302 may be fabricated by performing number of operations 306 on workpiece 308. Workpiece 308 may be comprised of number of layers 310. Number of layers 310 may be, for example, without limitation, metal, steel, nickel steel, alloy, titanium, aluminum, a composite material, air, copper, plastic, or some other suitable type of material. In these illustrative examples, number of operations 306 may be performed using number of machines 312.

In this illustrative example, number of machines 312 may be used to perform number of machining operations 314 within number of operations 306. Number of machining operations 314 may include operations that may remove material 315 from workpiece 308.

In these illustrative examples, number of machines 312 may include, for example, without limitation, milling machine 316, lathe 318, and/or any other suitable type of machine.

Tool holder 320 may be used in number of machines 312. Tool holder 320 may comprise rod 322. Sleeve 324 may be used with tool holder 320. Rod 322 may have first stiffness 330 in these illustrative examples. Rod 322 also may have first end 326 and second end 328. First interface 334 may be located at first end 326, while second interface 336 may be located at second end 328. First interface 334 may be configured for attachment to number of machines 312. Second interface 336 may be configured for holding tool 338. Tool 338 may be, for example, without limitation, a cutter, a blade, a drill bit, or some other suitable type of tool.

In these illustrative examples, sleeve 324 may have channel 332. First opening 335 may be located at first end 337 of channel 332, and second opening 339 may be located at second end 340 of channel 332.

Sleeve 324 may be configured to receive at least portion 342 of rod 322 through first opening 335 and second opening 339 in these illustrative examples. Sleeve 324 and rod 322 may be secured to each other through interference fit 344. In this illustrative example, sleeve 324 may have second stiffness 346. Second stiffness 346 may be greater than first stiffness 330 in these illustrative examples.

The combination of rod 322 with sleeve 324 may result in tool holder 320 having overall stiffness 348. Overall stiffness 348 may be greater than first stiffness 330, but may be less than second stiffness 346.

In these illustrative examples, rod 322 may be comprised of material 352. Sleeve 324 may be comprised of material 354. The selection of material 352 and material 354 may be such to obtain first stiffness 330 and second stiffness 346, respectively.

In these illustrative examples, material 352 may be, for example, without limitation, steel. Material 354 may be, for example, without limitation, a carbide, such as a carbide metal. The carbide metal may be, for example, without limitation, a combination of carbon and a metal that is less electronegative than carbon. In these illustrative examples, a carbide may be, for example, without limitation, tungsten carbide, titanium carbide, or any other suitable type of carbide metal. Of course, material 352 and material 354 may be selected from other types of materials. For example, without limitation, material 352 for rod 322 may be a material selected from aluminum, iron, titanium, or other suitable materials. Material 354 for sleeve 324 also may include, for example, without limitation, a ceramic material, calcium carbide, silicon carbide, a tungsten alloy, osmium, diamond, a rhenium alloy, molybdenum, composite materials, and/or other suitable materials.

In the illustrative examples, when tool holder 320 is configured for use with milling machine 316, first interface 334 may be configured for connection to spindle 356 in milling machine 316. In this manner, tool holder 320 with tool 338 may be rotated by spindle 356.

In yet other advantageous embodiments, when tool holder 320 is configured for use with lathe 318, tool holder 320 may be referred to as boring bar 358. In this type of embodiment, boring bar 358 may be secured to lathe 318 such that boring bar 358 may not rotate while workpiece 308 rotates.

Additionally, rod 322 may have cross section 360, and sleeve 324 may have cross section 362. Cross section 360 and cross section 362 may have a number of different shapes, depending on the particular implementation. Cross section 360 and cross section 362 may be, for example, without limitation, circles, hexagons, octagons, ellipses, and/or some other suitable shapes. Additionally, cross section 362 may taper along axis 363 for rod 322 and sleeve 324.

The illustration of fabrication environment 300 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, fabrication environment 300 may include other types of machines in addition to or in place of milling machine 316 and lathe 318. For example, number of machines 312 may include a sanding machine, a painting machine, a fastener system, or some other suitable type of machine. Further, although sleeve 324 is described as a single-piece sleeve, sleeve 324 may have multiple pieces that may be placed adjacent to each other to form channel 332. In some advantageous embodiments, sleeve 324 may be considered part of tool holder 320.

The different advantageous embodiments also recognize and take into account that tools, such as tool 338 in FIG. 3, may wear out more often than desired when performing different operations in fabrication environment 300. For example, without limitation, number of machining operations 314 may include milling operations. For example, without limitation, tool 338 may be comprised of steel, in which the milling operation may involve roughing and finishing workpiece 308. Tool 338 may be a cutting tool having edges with a spiral configuration along the surface of the tool. When performing milling operations, the cutting edges may wear more quickly than desired when tool 338 is comprised of steel.

The different advantageous embodiments recognize and take into account that tool 338 may be made of carbide instead of steel. With carbide, the cutting tool may have a longer life than a steel tool. However, with carbide, the cost may be greater than a steel tool before requiring replacement and/or rework.

For example, as the diameter and length of the tool increases, the amount of material needed to manufacture the tool also increases. With greater costs for carbide as compared to steel, carbide tools may become more expensive than desired, as the diameter and/or length of the tool increases for different uses.

The different advantageous embodiments also recognize and take into account that in some cases carbide may be braised or attached to a steel core or rod. The different advantageous embodiments recognize and take into account that with this type of tool, the number of cutting edges may be limited. As a result, the number of cutting edges may be less than desired.

Thus, the different advantageous embodiments provide a method and apparatus for a tool. The tool may comprise a sleeve and a number of cutting edges. The sleeve may have a first end, a second end, a surface, and a channel with a first opening for the channel at the first end of the sleeve and a second opening for the channel at the second end of the sleeve. The number of cutting edges may be associated with a surface of the sleeve.

The sleeve may be configured to receive at least a portion of a tool holder in the channel. The tool holder may have a first stiffness, and the sleeve may have a second stiffness in which the second stiffness may be greater than the first stiffness.

Figure 4:
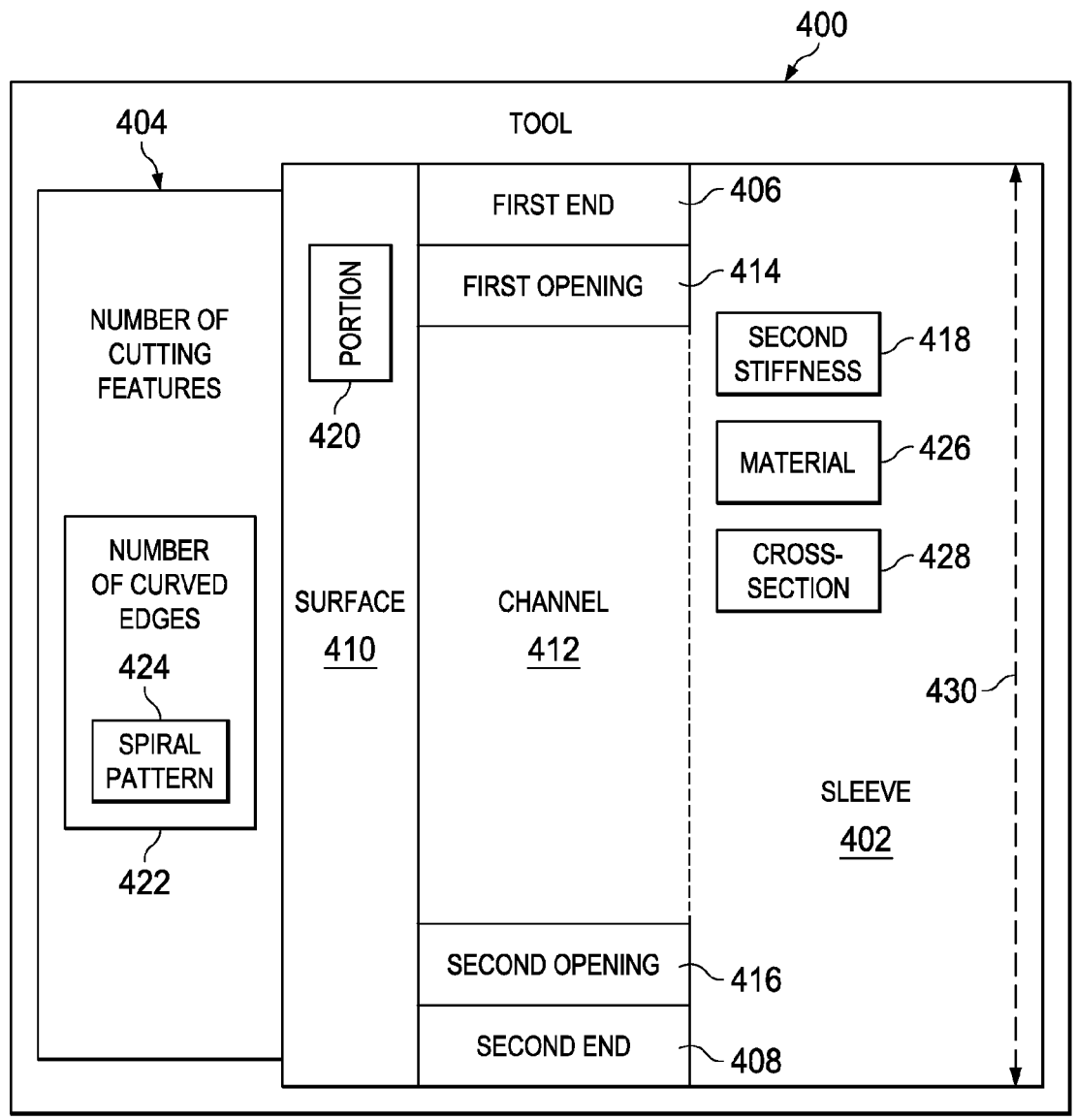
FIG. 4 is an illustration of a tool in accordance with an advantageous embodiment.

With reference now to FIG. 4, an illustration of a tool is depicted in accordance with an advantageous embodiment. In this illustrative example, tool 400 may be used in fabrication environment 300 in FIG. 3. Tool 400 may be used with tool holder 320 in FIG. 3. Tool 400 may replace sleeve 324 and tool 338 in these illustrative examples.

As depicted, tool 400 may comprise sleeve 402 and number of cutting features 404. In these illustrative examples, sleeve 402 may have first end 406, second end 408, surface 410, and channel 412. Channel 412 may extend from first end 406 to second end 408. Channel 412 may have first opening 414 at first end 406 and second opening 416 at second end 408. In these illustrative examples, sleeve 402 may have second stiffness 418. Second stiffness 418 may be greater than first stiffness 330 of rod 322 for tool holder 320 in FIG. 3.

In these examples, sleeve 402 may be configured to receive at least a portion of tool holder 320 in FIG. 3. For example, without limitation, second opening 416 for channel 412 may receive second end 328 of rod 322 in tool holder 320.

In these illustrative examples, number of cutting features 404 may be associated with surface 410. A first component may be considered to be associated with a second component by being secured to the second component, bonded to the second component, fastened to the second component, and/or connected to the second component in some other suitable manner. The first component also may be connected to the second component by using a third component. The first component also may be considered to be associated with the second component by being formed as part of and/or an extension of the second component.

Number of cutting features 404 may cover at least portion 420 of surface 410. In some illustrative examples, number of cutting features 404 may extend from first end 406 to second end 408 of sleeve 402. In other advantageous embodiments, number of cutting features 404 may only be present on portion 420 of surface 410 for sleeve 402.

In these illustrative examples, number of cutting features 404 may be associated with surface 410 in a number of different ways. For example, without limitation, number of cutting features 404 may be formed on surface 410. Number of cutting features 404 may be formed by machining or otherwise changing the shape of surface 410 to include number of cutting features 404.

In other illustrative examples, number of cutting features 404 may be joined to surface 410. For example, without limitation, number of cutting features 404 may be joined to surface 410 by braising. Braising may be a metal joining process. In yet other illustrative examples, surface 410 may include grooves through which number of cutting features 404 may be mechanically attached to sleeve 402. For example, without limitation, portions of number of cutting features 404 may be slid or pushed into the grooves of surface 410 to lock or be secured to portions of the grooves.

In these illustrative examples, number of cutting features 404 may take a number of different forms. For example, without limitation, number of cutting features 404 may comprise number of curved edges 422. Number of curved edges 422 may be formed on surface 410 of sleeve 402. In these illustrative examples, number of curved edges 422 may have spiral pattern 424. For example, without limitation, each of number of cutting features 404 may extend around surface 410 from first end 406 to second end 408.

In these depicted examples, sleeve 402 may be comprised of material 426. Material 426 may be selected from a group consisting of, for example, without limitation, titanium carbide, tungsten carbide, titanium, zirconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, rhodium, ceramic material, calcium carbide, silicon carbide, tungsten alloy, diamond, rhenium alloy, composite materials, and/or other suitable materials or combinations of materials. As one illustrative example, material 426 is selected based on whether material 426 provides desired cutting characteristics for the particular workpiece and if material 426 provides a desired modulus of elasticity. In these examples, with a workpiece being made of metal, material 426 may be a tungsten carbide.

Sleeve 402 may have cross section 428. Cross section 428 may correspond to cross section 360 of rod 322 for tool holder 320 in FIG. 3. Cross section 428 may have a number of different shapes, depending on the particular implementation. For example, without limitation, cross section 428 may be a circle, a hexagon, an octagon, an ellipse, and/or some other suitable shape. Additionally, cross section 428 may taper along axis 430 extending through sleeve 402.

The illustration of tool 400 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, number of cutting features 404 may have other forms other than a spiral pattern. For example, number of cutting features 404 may have different ranges of helix angles for cutting edges.

As another example, number of cutting features 404 may include cutting edges that may have serrations. The serrations may provide improvements for chip breaking. Serrations may have an effect on the distribution of cutting forces involved in chip forming. The alteration of cutting forces may suppress chatter vibrations that may normally occur when using a standard helix on the cutting edge. This suppression may allow for a larger depth of cut to be made by a cutting tool before having undesired chatter or vibration occur.

As another example, number of cutting features 404 may be straight edges, such as those used in a boring bar. Still other forms of cutting features in addition to or in place of these may be used, depending on the implementation.

In this manner, when sleeve 402 is made out of a material that may be more expensive than desired for cutting tools, channel 412 may reduce the amount of material 426 needed to form tool 400. Further, the combination of sleeve 402 with rod 322 on tool holder 320 may provide a desired amount of stiffness for use in performing number of operations 306 in fabrication environment 300 in FIG. 3.

As another example of variations that may be made, other advantageous embodiments may include more than one sleeve that is slid onto and attached to tool holder 320 in FIG. 3. For example, two tools, such as tool 400 and tool 338, may be configured to be slid onto tool holder 320 in FIG. 3. One tool may have a different number or type of cutting features as compared to the other sleeve.

Figure 5:
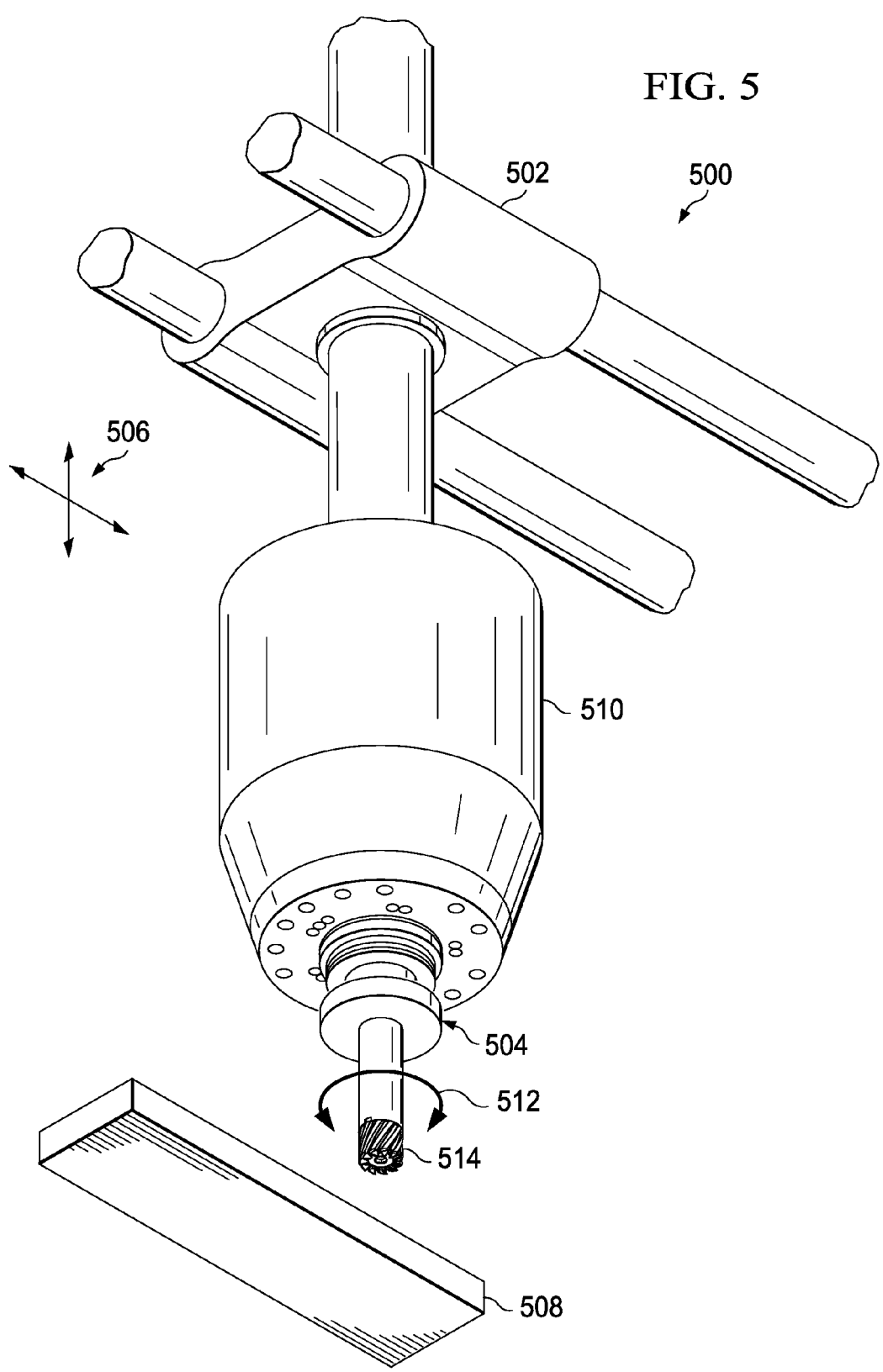
FIG. 5 is an illustration of a fabrication environment in accordance with an advantageous embodiment.

With reference next to FIG. 5, an illustration of a fabrication environment is depicted in accordance with an advantageous embodiment. In this illustrative example, fabrication environment 500 may be an example of one implementation of fabrication environment 300 in FIG. 3. In this illustrative example, only a portion of milling machine 502 is depicted.

In this illustrative example, fabrication environment 500 may comprise milling machine 502 and tool holder 504. In this example, milling machine 502 may be an example of one implementation of milling machine 316 in number of machines 312 in FIG. 3. As depicted, milling machine 502 may be moved about axes 506. Milling machine 502 may perform operations on workpiece 508.

Tool holder 504 may hold tool 514 in this illustrative example. As depicted, tool holder 504 may be connected to spindle 510 of milling machine 502. Spindle 510 may rotate tool holder 504 in the direction of arrow 512. In this illustrative example, tool 514 may be moved relative to workpiece 508. Workpiece 508 may remain stationary in these illustrative examples.

The illustration of fabrication environment 500 is only an example of one manner in which fabrication environment 500 may be implemented. This illustration is not meant to imply physical or architectural limitations to the manner in which other advantageous embodiments may be implemented. For example, in other advantageous embodiments, tool holder 504 may be stationary, while workpiece 508 is moved by lathe 318 in FIG. 3.

With reference now to FIG. 6, an illustration of an exploded perspective view of a tool holder with a sleeve is depicted in accordance with an advantageous embodiment. Tool holder 504 from FIG. 5 is shown in a more detailed view. In this illustrative example, tool holder 504 may be an example of one implementation for tool holder 320 in FIG. 3.

As depicted, tool holder 504 may comprise rod 602. Sleeve 604 may be used with tool holder 504. Sleeve 604 may be an example of an implementation of sleeve 324 in FIG. 3. Additionally, rod 602 may have first end 606 and second end 608. Tool holder 504 also may have first interface 610 and second interface 612.

First interface 610 at first end 606 may be configured to be attached to spindle 510 of milling machine 502 in FIG. 5. Second interface 612 at second end 608 may be configured to hold tool 514.

In this illustrative example, second interface 612 may comprise threaded channel 613. Screw 614 may be placed through channel 615 in tool 514 and engage threaded channel 613 to secure tool 514 to second interface 612.

As depicted, sleeve 604 may have cylindrical shape 616. Sleeve 604 may have channel 618 with first opening 620 at first end 622 and second opening 624 at second end 626. Sleeve 604 may be configured to receive at least a portion of rod 602 through first opening 620 and second opening 624. Sleeve 604 may be attached to rod 602 through an interference fit in this illustrative example. In other advantageous embodiments, sleeve 604 may be removable from rod 602.

With reference now to FIG. 7, an illustration of a perspective view of tool holder 504 and sleeve 604 are depicted in accordance with an advantageous embodiment. In this illustration, tool holder 504 and sleeve 604 are shown in an assembled view with tool 514 secured to second interface 612, which is hidden in this view.

Figure 8:
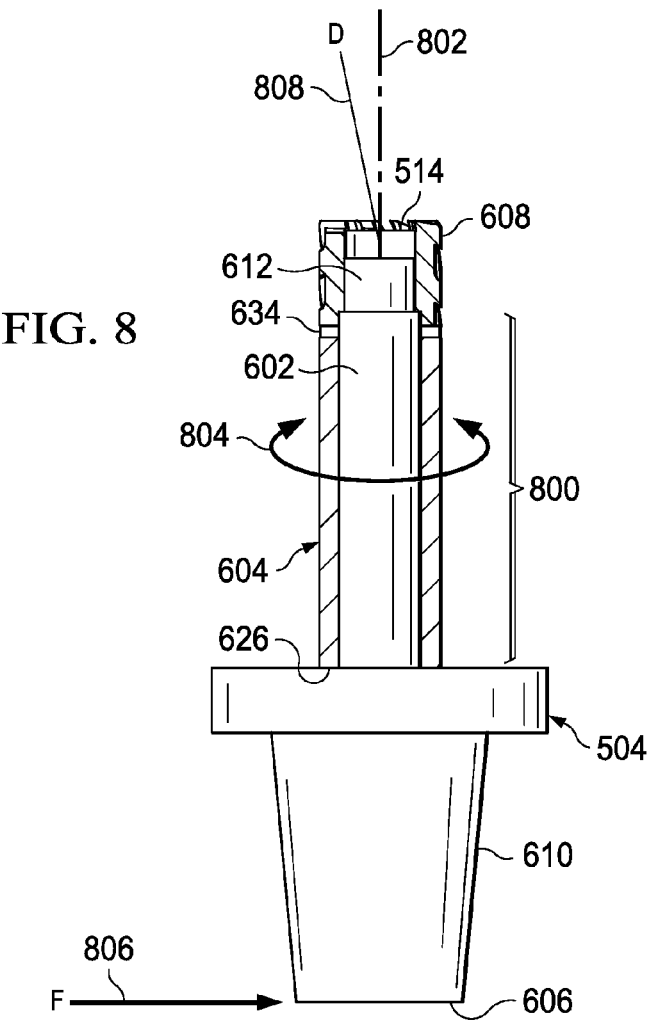
FIG. 8 is an illustration of a cross-sectional side view of a tool holder with a sleeve in accordance with an advantageous embodiment.

With reference now to FIG. 8, an illustration of a cross-sectional side view of a tool holder with a sleeve is depicted in accordance with an advantageous embodiment. In this illustrative example, tool holder 504 and sleeve 604 are shown in a cross-sectional side view taken along lines 8-8 in FIG. 7.

As illustrated, rod 602 may have length L 800. In this illustrative example, length L 800 may be the length of rod 602. Length L 800 may not include first interface 610 and second interface 612.

In this illustrative example, tool holder 504 may have center line 802. Rod 602 for tool holder 504 may rotate about center line 802 in the direction of arrow 804 in these illustrative examples.

In these illustrative examples, during rotation of tool holder 504, force F 806 may be applied to first end 606 of tool holder 504 when tool holder 504 and sleeve 604 with tool 514 is used to perform operations. During rotation of rod 602, rod 602 may be deflected or bent away from center line 802 by application of force F 806. This deflection of rod 602 may be deflection D 808.

Figure 9:
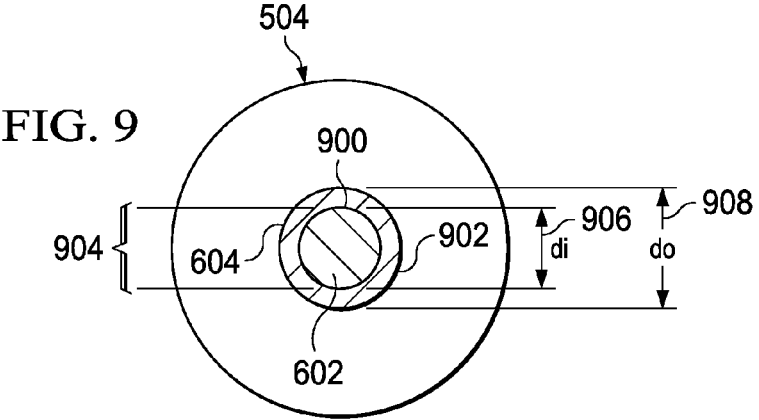
FIG. 9 is an illustration of a cross-sectional view of a tool holder with a sleeve in accordance with an advantageous embodiment.

With reference now to FIG. 9, an illustration of a cross-sectional view of a tool holder with a sleeve is depicted in accordance with an advantageous embodiment. In this illustrative example, a cross-sectional view of tool holder 504 and sleeve 604 from first end 606 is illustrated. This view is taken along lines 9-9 in FIG. 7.

In this illustration, rod 602 may have cross section 900, and sleeve 604 may have cross section 902. In this illustrative example, cross section 900 and cross section 902 may have the shape of a circle.

Cross section 900 for rod 602 may have diameter 904. Cross section 902 for sleeve 604 may have inner diameter 906 and outer diameter 908.

With reference now to FIG. 10, an illustration of a perspective view of a tool holder with a sleeve is depicted in accordance with an advantageous embodiment. In this illustrative example, tool holder 1000 is an illustrative example of another implementation for tool holder 320 in FIG. 3.

As depicted, tool holder 1000 may include rod 1002. Sleeve 1004 may be used with rod 1002. Sleeve 1002 may be an example of an implementation of sleeve 324 in FIG. 3. As illustrated, rod 1002 may have first interface 1006 and second interface 1008.

First interface 1006 may be configured for attachment to a machine, such as milling machine 502 in FIG. 5 or milling machine 316 in FIG. 3. Second interface 1008 may be configured to receive tool 1010. In this example, tool 1010 may take the form of cutter 1012. Second interface 1008 may take the form of hydraulic holder 1014. When member 1016 of tool 1010 is placed into channel 1018 of hydraulic holder 1014, screw 1020 in hydraulic holder 1014 may be turned to cause pressure to be exerted by walls 1022 of channel 1018 of hydraulic holder 1014 on member 1016 of cutter 1012.

Sleeve 1004 may have channel 1024. Sleeve 1004 may have first opening 1026 and second opening 1028 for channel 1024. Channel 1024 may be configured to receive rod 1002 in first opening 1026 and/or second opening 1028 in these illustrative examples.

With reference now to FIG. 11, an illustration of a perspective view of a tool holder with a sleeve is depicted in accordance with an advantageous embodiment. In this illustrative example, tool holder 1000 is shown in a perspective view in an assembled state.

Turning now to FIG. 12, an illustration of a perspective view of a tool holder with a sleeve is depicted in accordance with an advantageous embodiment. In this illustrative example, tool holder 1200 may be an example of an implementation for tool holder 320 in FIG. 3. In this illustrative example, tool holder 1200 may be used in milling machine 316 in FIG. 3 or milling machine 502 in FIG. 5.

As illustrated, tool holder 1200 may comprise rod 1202. Sleeve 1204 may be used with tool holder 1200. Sleeve 1204 may be an example of an implementation of sleeve 324 in FIG. 3. Rod 1202 may have first interface 1206 and second interface 1208.

First interface 1206 may be configured to be secured to a machine, such as milling machine 316 in FIG. 3 or milling machine 502 in FIG. 5. Second interface 1208 may be configured to receive tool 1210. In these examples, tool 1210 may be cutter 1212. Cutter 1212 may have channel 1214, which may receive second interface 1208. Screw 1216 may be placed through channel 1214 and into threaded channel 1218 in second interface 1208.

In this illustrative example, sleeve 1204 may have channel 1220 with first opening 1222 and second opening 1224. Rod 1202 may be received through second opening 1224 into channel 1220 and through first opening 1222 in these illustrative examples.

In this example, rod 1202 may have cross section 1226 in the shape of octagon 1228. In a similar fashion, channel 1220 also may have cross section 1230 in the shape of octagon 1232.

With reference now to FIG. 13, an illustration of a perspective view of a tool holder with a sleeve is depicted in accordance with an advantageous embodiment. In this example, tool holder 1200 is shown in an assembled view.

Figure 14:
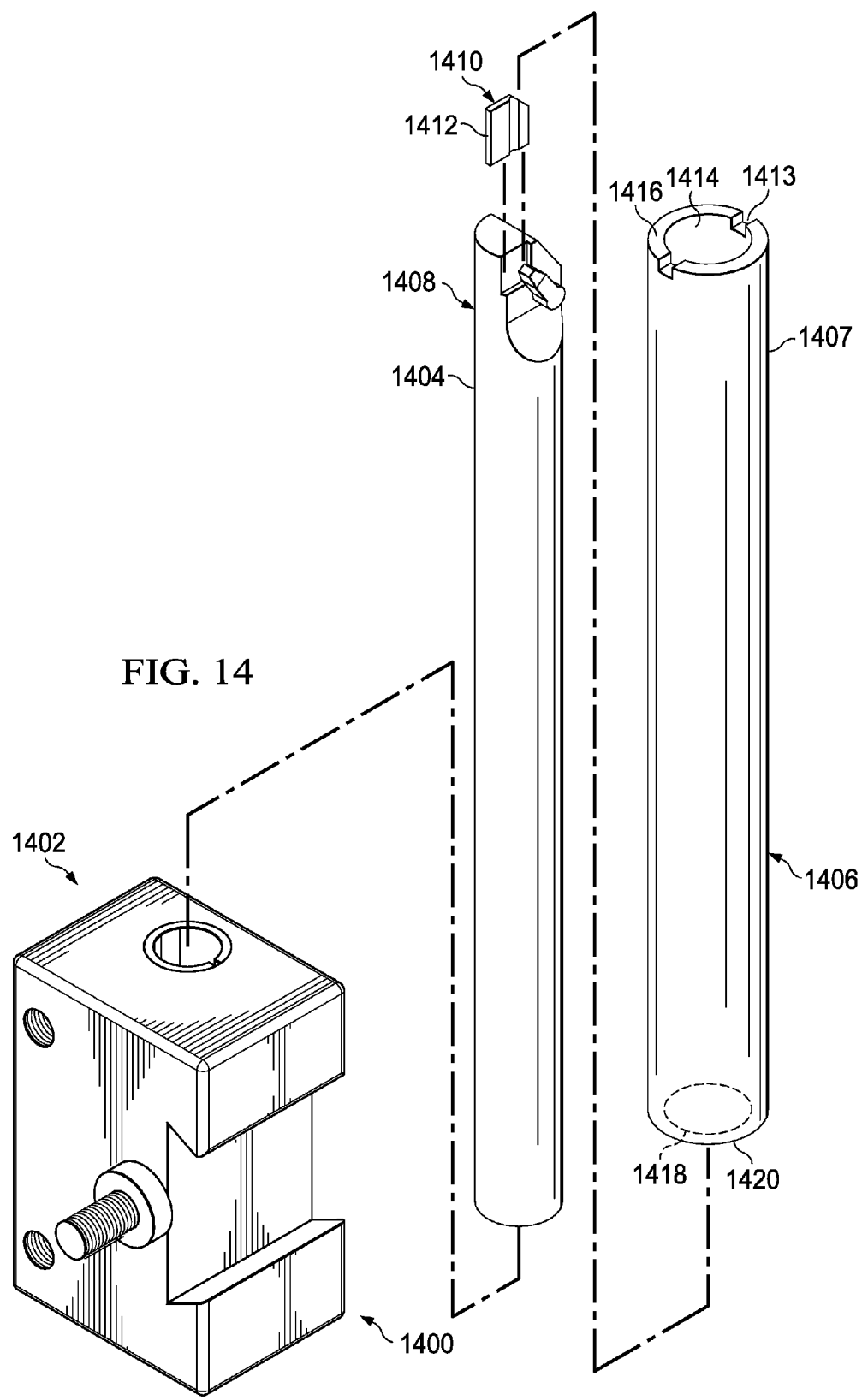
FIG. 14 is an illustration of a tool holder in the form of a boring bar with a sleeve in accordance with an advantageous embodiment.

With reference now to FIG. 14, an illustration of a tool holder in the form of a boring bar with a sleeve is depicted in accordance with an advantageous embodiment. In this illustrative example, an exploded perspective view of tool holder 1400 is illustrated. In this illustrative example, tool holder 1400 may be boring bar 1402. Boring bar 1402 is an example of another implementation for tool holder 320 in FIG. 3.

Boring bar 1402 may comprise rod 1404. Sleeve 1406 may be used with boring bar 1402. Sleeve 1406 may be an example of an implementation of sleeve 324 in FIG. 3. Rod 1404 may have interface 1407 and interface 1408.

Interface 1408 may be configured for attachment to a machine, such as lathe 318 in FIG. 3. Interface 1408 may receive cutter 1410. In this example, cutter 1410 may take the form of blade 1412.

Sleeve 1406 may have channel 1413 with opening 1414 at end 1416 and opening 1418 at end 1420. Sleeve 1406 may receive rod 1404. Sleeve 1406 may be attached or removably placed over rod 1404 in these illustrative examples.

Figure 15:
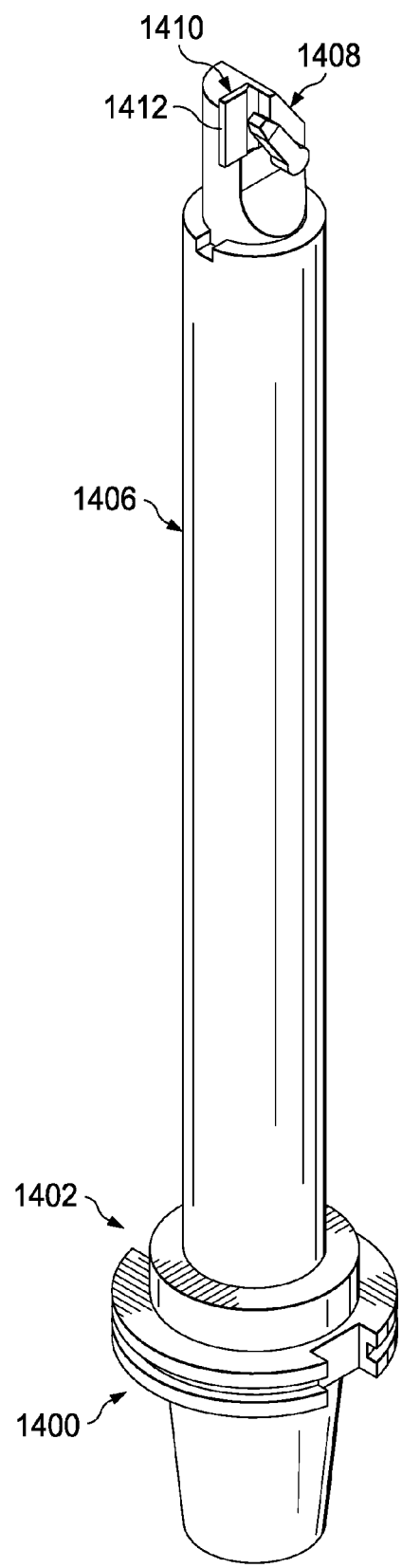
FIG. 15 is an illustration of a perspective view of a tool holder with a sleeve in accordance with an advantageous embodiment.

In FIG. 15, an illustration of a perspective view of a tool holder with a sleeve is depicted in accordance with an advantageous embodiment. Tool holder 1400 is illustrated in an assembled form in this figure.

The illustrations of tool holders 504 in FIGS. 5-9, tool holder 1000 in FIGS. 10-11, tool holder 1200 in FIGS. 12-13, and tool holder 1400 in FIGS. 14-15 are presented only as examples of some implementations for tool holder 320 in FIG. 3. Sleeve 604 in FIGS. 5-9, sleeve 1004 in FIGS. 10-11, sleeve 1204 in FIG. 12-12, and sleeve 1424 in FIGS. 14-15 are present only as examples of some implementations for sleeve 324 in FIG. 3. These illustrative examples are not meant to imply physical or architectural limitations to the manner in which tool holder 320 may be implemented in other advantageous embodiments.

For example, in other advantageous embodiments, a tool holder may have a different cross-sectional shape in place of a circle or octagon as shown for tool holder 504 and tool holder 1200, respectively. As another example, a tool holder may be configured for use with other machines, other than a milling machine or lathe. These machines may be, for example, without limitation, routers, gear hobbing machines, shapers, and/or other suitable machines.

Figure 16:
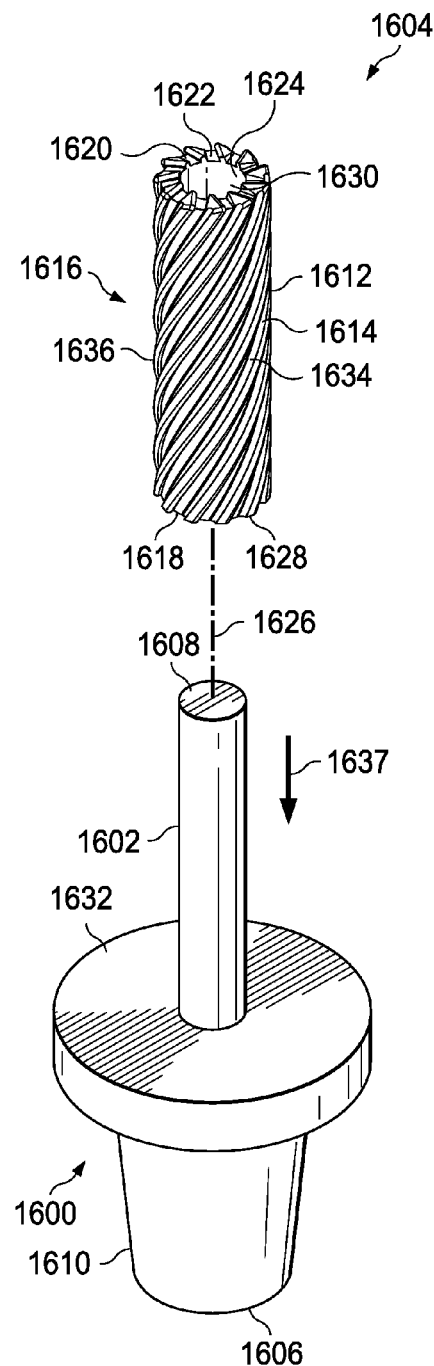
FIG. 16 is an illustration of an exploded perspective view of a tool holder with a tool in accordance with an advantageous embodiment.

With reference now to FIG. 16, an illustration of an exploded perspective view of a tool holder with a tool is depicted in accordance with an advantageous embodiment. In this example, without limitation, tool holder 1600 is an example of one implementation for tool holder 320 in FIG. 3.

As depicted, tool holder 1600 may comprise rod 1602. Tool 1604 may be used with tool holder 1600. Tool 1604 is an example of one implementation of tool 400 in FIG. 4.

In this illustrative example, rod 1600 may have first end 1606 and second end 1608. In this illustrative example, tool holder 1600 may have interface 1610 at first end 1606. Interface 1610 may correspond to first interface 334 for tool holder 320 in FIG. 3. Interface 1610 may be configured to be attached to spindle 510 of milling machine 502 in FIG. 5.

As depicted in this example, tool 1604 may take the form of sleeve 1612 and number of cutting features 1614. Sleeve 1612 may have cylindrical shape 1616. In this example, sleeve 1612 may have first end 1618 and second end 1620. Additionally, sleeve 1612 also may have surface 1622 and channel 1624. Channel 1624 may extend through sleeve 1612 along axis 1626. Additionally, first opening 1628 may be present at first end 1618 for channel 1624. Second opening 1630 may be present at second end 1620 for channel 1624.

Number of cutting features 1614 may be associated with surface 1622 of sleeve 1612. In these illustrative examples, number of cutting features 1614 may take the form of curved edges 1634. In these examples, curved edges 1634 may be formed as part of surface 1622. Curved edges 1634 may have spiral configuration 1636 and may extend from first end 1618 to second end 1620 of sleeve 1612.

In these illustrative examples, sleeve 1612 may be configured to receive at least a portion of rod 1602 for tool holder 1600. In particular, channel 1624 may be configured to receive a portion of rod 1602. As depicted, second end 1608 of rod 1602 may be placed into channel 1624 through first opening 1628 in this example.

In these examples, second end 1620 may slide towards base 1632 of tool holder 1600 in the direction of arrow 1637. First end 1628 of sleeve 1612 may be located adjacent to or against base 1636 when placed onto tool holder 1600.

Sleeve 1612 may be attached to rod 1602 through an interference fit in this illustrative example. In other advantageous embodiments, sleeve 1612 may be removable from rod 1602.

Figure 17:
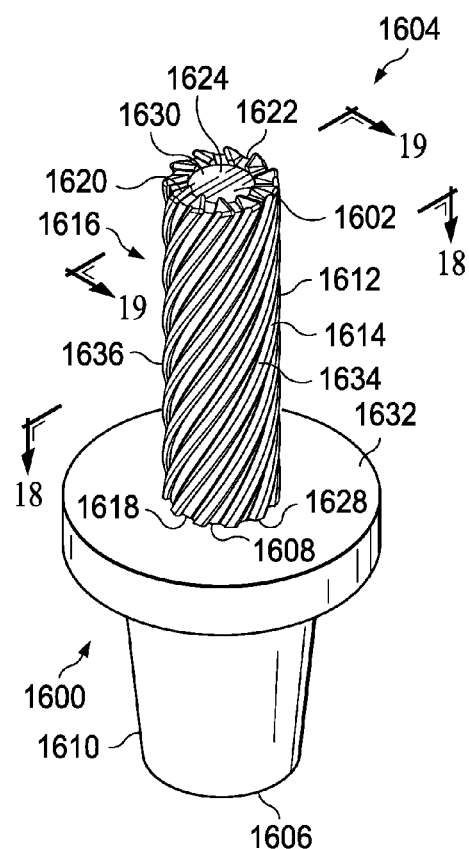
FIG. 17 is an illustration of a perspective view of a tool holder with a tool in accordance with an advantageous embodiment.

With reference now to FIG. 17, an illustration of a perspective view of a tool holder with a tool is depicted in accordance with an advantageous embodiment. In this illustrative example, tool holder 1600 and tool 1604 are shown in an assembled view.

With reference now to FIG. 18, an illustration of a cross-sectional side view of a tool holder with a tool is depicted in accordance with an advantageous embodiment. In this illustrative example, tool holder 1600 and tool 1604 are shown in a cross-sectional side view taken along lines 18-18 in FIG. 17. In this depicted example, length L 800 may be the length of rod 1602.

In this illustrative example, tool holder 1600 may have center line 1802. Rod 1602 for tool holder 1600 may rotate about center line 1802 in the direction of arrow 1804 in these illustrative examples.

As depicted, during rotation of tool holder 1600, force F 1806 may be applied to first end 1606 of tool holder 1600 when tool holder 1600 and tool 1604 are used to perform operations. During rotation of rod 1602, rod 1602 may be deflected or bent away from center line 1802 by application of force F 1806. This deflection of rod 1802 may be deflection D 1808. With the combination of tool 1604 and rod 1602, the amount of deflection may be at a desired level.

With reference now to FIG. 19, an illustration of a cross-sectional view of a tool holder with a tool is depicted in accordance with an advantageous embodiment. In this depicted example, a cross-sectional view of tool holder 1600 and tool 1604 from second end 1620 of sleeve 1612 is illustrated. This view is taken along lines 19-19 in FIG. 17. In this illustration, cross section 1900 for tool 1604 may have inner diameter 1902 and outer diameter 1904.

Figure 20:
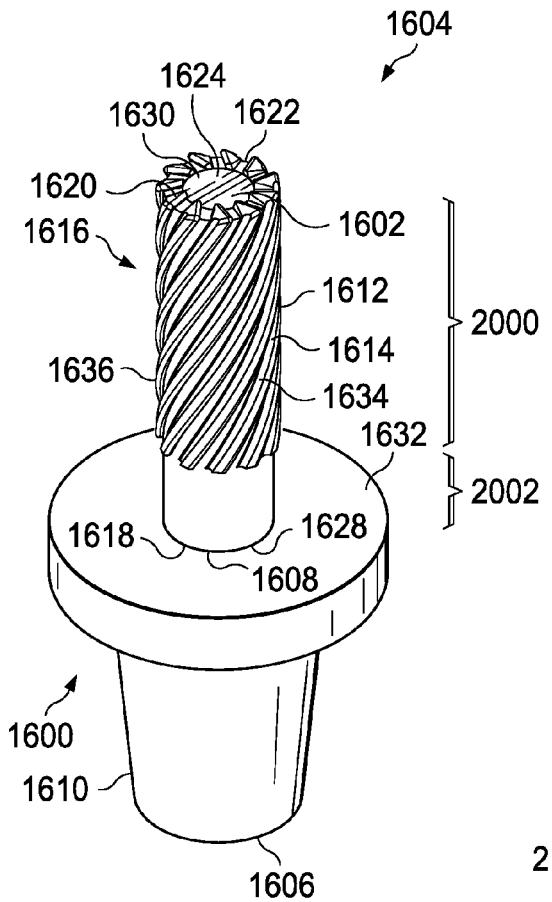
FIG. 20 is an illustration of a perspective view of a tool holder with a tool in accordance with an advantageous embodiment.

With reference now to FIG. 20, an illustration of a perspective view of a tool holder with a tool is depicted in accordance with an advantageous embodiment. In this illustrative example, tool holder 1600 and tool 1604 are shown in an assembled view. As depicted, number of cutting features 1614 for tool 1604 may only cover portion 2000 of surface 1622 of sleeve 1612. Portion 2002 of surface 1622 of sleeve 1612 may not have any cutting features associated with portion 2002.

Figure 21:
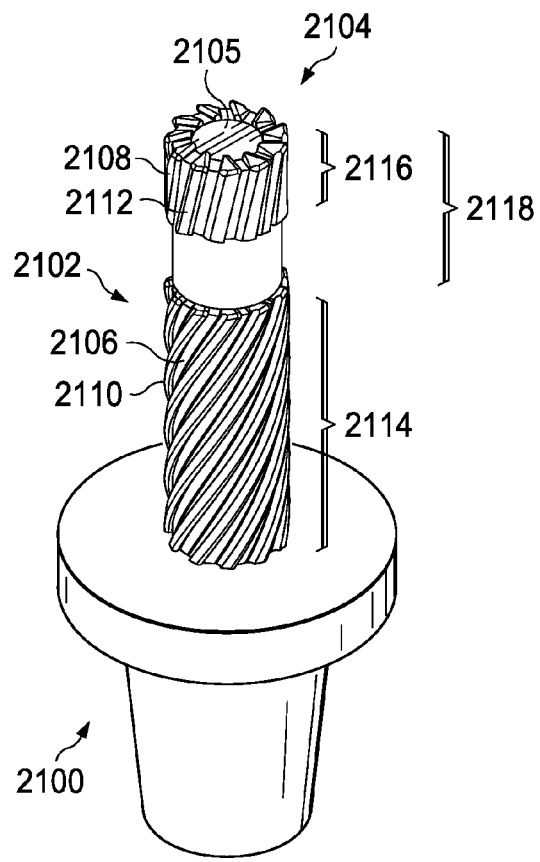
FIG. 21 is an illustration of a tool holder with tools in accordance with an advantageous embodiment.

With reference now to FIG. 21, an illustration of a tool holder with tools is depicted in accordance with an advantageous embodiment. In this illustrative example, tool holder 2100 may hold tool 2102 and tool 2104. As depicted, both tool 2102 and tool 2104 may be secured to rod 2105 on tool holder 2100. Tool 2102 and tool 2104 may each be examples of implementations of tool 400 in FIG. 4.

In this illustrative example, tool 2102 may have cutting features 2106, while tool 2104 may have cutting features 2108. Cutting features 2106 may be in spiral configuration 2110, while cutting features 2108 may have angled configuration 2112. Further, in this example, number of cutting features 2106 may extend along length 2114, while cutting features 2108 may only extend along portion 2116 of length 2118. Additionally, in this example, length 2114 may be greater than length 2118.

Of course, other implementations may include other numbers of tools on tool holder 2100 with other numbers or types of cutting features, depending on the particular implementation.

Figure 22:
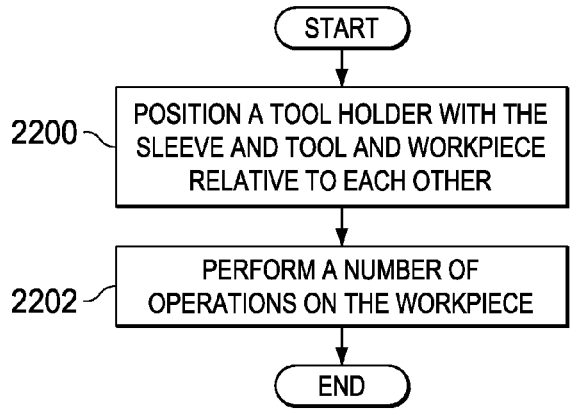
FIG. 22 is an illustration of a flowchart of a process for performing an operation on a workpiece in accordance with an advantageous embodiment.

With reference now to FIG. 22, an illustration of a flowchart of a process for performing an operation on a workpiece is depicted in accordance with an advantageous embodiment. The process illustrated in FIG. 22 may be implemented in fabrication environment 300 in FIG. 3. In this illustrative example, number of operations 306 may be performed on workpiece 308 using number of machines 312.

The process may begin by positioning tool holder 320 with sleeve 324 and tool 338 and workpiece 308 relative to each other (operation 2200). The positioning of tool holder 320 with tool 338 relative to workpiece 308 may be performed in a number of different ways, depending on the particular machine in number of machines 312. For example, if milling machine 316 is used, workpiece 308 may be stationary. If lathe 318 is used, tool holder 320 may be stationary while workpiece 308 moves.

Thereafter, number of operations 306 are performed on workpiece 308 (operation 2202), with the process terminating thereafter.

The different operations illustrated in FIG. 22 also may be performed using tool holder 320 with tool 400. In this advantageous embodiment, tool 400 may replace sleeve 324 and tool 338.

Figure 23:
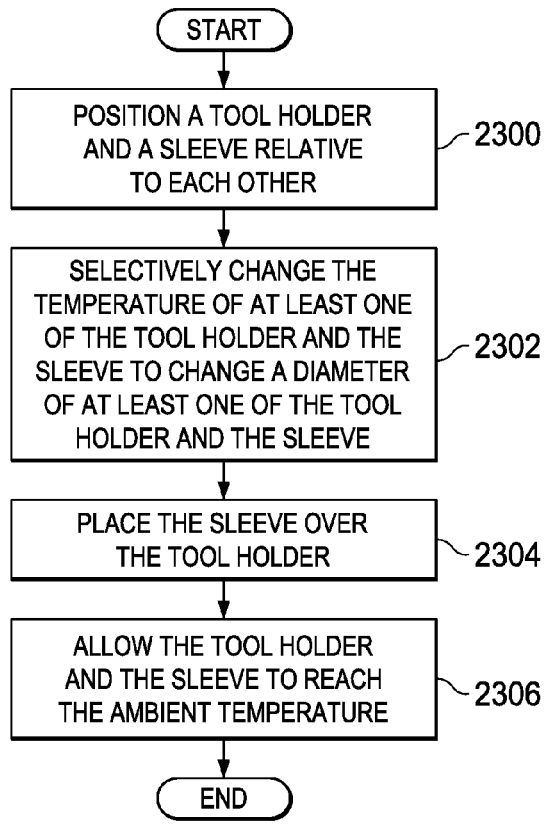
FIG. 23 is an illustration of a flowchart of a process for forming an interference fit between a tool holder and a sleeve in accordance with an advantageous embodiment.

With reference now to FIG. 23, an illustration of a flowchart of a process for forming an interference fit between a tool holder and a sleeve is depicted in accordance with an advantageous embodiment. The process illustrated in FIG. 23 may be implemented using tool holder 320 and sleeve 324 in FIG. 3.

The process may begin by positioning tool holder 320 and sleeve 324 relative to each other (operation 2300). In particular, in operation 2300, sleeve 324 and rod 322 of tool holder 320 may be positioned relative to each other. The process may then selectively change the temperature of at least one of tool holder 320 and sleeve 324 to change a diameter of at least one of tool holder 320 and sleeve 324 (operation 2302). The diameters of tool holder 320 and/or sleeve 324 may be changed such that sleeve 324 is capable of fitting over tool holder 320. As one example, without limitation, tool holder 320 may be cooled to reduce the diameter of tool holder 320. In another example, sleeve 324 may be heated to increase the diameter of sleeve 324. In yet another example, tool holder 320 may be cooled and sleeve 324 may be heated.

Thereafter, sleeve 324 may be placed over tool holder 320 (operation 2304). For example, a selected amount of force may be used to place and/or slide sleeve 324 over tool holder 320 such that sleeve 324 covers at least a portion of tool holder 320. In this illustrative example, sleeve 324 may be placed over rod 322 of tool holder 320 such that sleeve 324 receives rod 322 in channel 332.

The process may then allow tool holder 320 and sleeve 324 to reach an ambient temperature (operation 2306), with the process terminating thereafter. In this manner, interference fit 344 may be formed between sleeve 324 and tool holder 320. In other words, sleeve 324 may fit over tool holder 320 with a tightness such that sleeve 324 is fastened to tool holder 320.

Figure 24:
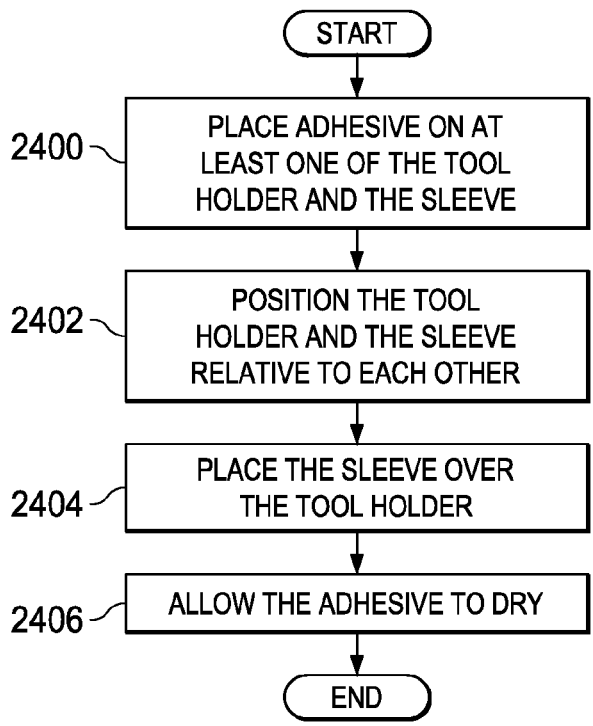
FIG. 24 is an illustration of a flowchart of a process for fastening a sleeve to a tool holder in accordance with an advantageous embodiment.

With reference now to FIG. 24, an illustration of a flowchart of a process for fastening a sleeve to a tool holder is depicted in accordance with an advantageous embodiment. The process illustrated in FIG. 24 may be implemented using tool holder 320 and sleeve 324 in FIG. 3.

The process may begin by placing an adhesive on at least one of tool holder 320 and sleeve 324 (operation 2400). In this illustrative example, adhesive may be placed on the outside of rod 322 of tool holder 320 and/or on the inside of channel 332 of sleeve 324. In other examples, adhesive may be placed on one of rod 322 and sleeve 324. In yet other examples, adhesive may be placed on a portion of tool holder 320 and/or sleeve 324.

Thereafter, the process may position tool holder 320 and sleeve 324 relative to each other (operation 2402). The process may then place sleeve 324 over tool holder 320 (operation 2404). In this illustrative example, sleeve 324 may be placed over and/or slide over rod 322 of tool holder 320 such that sleeve 324 covers at least a portion of tool holder 320. The process may then allow the adhesive to dry (operation 2404), with the process terminating thereafter. In this manner, sleeve 324 may be fastened to tool holder 320.

The operations performed in FIGS. 23 and 24 to fasten sleeve 324 to tool holder 320 also may be used to fasten tool 400 to tool holder 320. Additionally, in some advantageous embodiments, other mechanisms may be used to attach tool 400 to tool holder 320. For example, a mechanical fastener may be placed at an end of tool holder 320 and tool 400 after tool 400 has been slid over rod 322 of tool holder 320.

Figure 25:
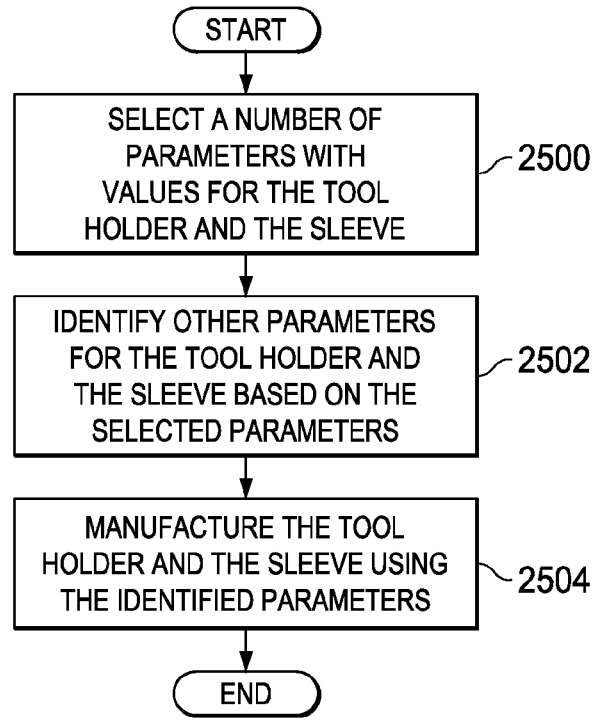
FIG. 25 is an illustration of a flowchart of a process for fabricating a tool holder in accordance with an advantageous embodiment.

With reference now to FIG. 25, an illustration of a flowchart of a process for fabricating a tool holder is depicted in accordance with an advantageous embodiment. The process illustrated in FIG. 25 may be used to design and/or manufacture tool holder 320 and sleeve 324 in FIG. 3.

The process may begin by selecting a number of parameters with values for tool holder 320 and sleeve 324 (operation 2500). For example, without limitation, the number of parameters may include at least one of a length for rod 322, a diameter for rod 322, a diameter for sleeve 324, first stiffness 330, second stiffness 346, overall stiffness 348, elasticity for rod 322, elasticity for sleeve 324, and/or other suitable parameters.

Thereafter, the process may identify other parameters for tool holder 320 and sleeve 324 based on the selected parameters (operation 2502). In this illustrative example, an equation for deflection may be used to identify various parameters, depending on the selected parameters. Deflection may be calculated as follows:

$$\frac{FL^3}{3EI}$$

wherein F may be force in pounds, L may be length, E may be Young's modulus in pounds per square inch, and I may be cross-sectional inertia. In these examples, Young's modulus may be used to measure elasticity.

When rod 322 and sleeve 324 have different elasticities, deflection may be calculated as follows:

$$D = \frac{FL^3}{(E_2L_2 + E_2I_2)}$$

and the cross-sectional inertia may be calculated as follows:

$$I = \frac{\pi(d_o^4 - d_i^4)}{64}$$

wherein $d_o$ may be an outer diameter and $d_i$ may be an inner diameter. When the cross-sectional inertia is calculated for rod 322, $d_i$ may be zero, because rod 322 may not have an inner diameter.

Thereafter, tool holder 320 and sleeve 324 may be manufactured using the identified parameters (operation 2504), with the process terminating thereafter.

In one illustrative example, tool holder 320 may be selected such that the length of rod 322 has about a six-inch length with about a 1.5 inch diameter. Further, sleeve 324 may be selected to have about a two-inch outer diameter and about a 1.5 inch inner diameter. In this particular example, rod 322 may be made of steel, and sleeve 324 may be made of carbide. The elasticity for steel may be about 29,007,550 pounds per square inch, and the elasticity for carbide may be about 87,022,640 pounds per square inch. With this particular illustrative example, the cross-sectional inertia for rod 322 and sleeve 324 may be as follows:

$$I_1 = \frac{\pi(1.5^4 - 0)}{64}$$

and $$I_2 = \frac{\pi(2^4 - 1.5^4)}{64}.$$

The deflection equation may then be as follows:

$$D = \frac{(325) \cdot 6^3}{3(E_1 \cdot I_1 + E_2 \cdot I_2)} = 0.00039 \text{ in}$$

The different operations in FIG. 25 used to design and/or manufacture tool holder 320 in sleeve 324 also may be used to manufacture tool holder 320 and tool 400. The different operations performed for designing to sleeve 1724 may be applied to tool 400 in the different operations in FIG. 25.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for performing actions on a workpiece. In one advantageous embodiment, an apparatus may comprise a rod and a sleeve. The rod and sleeve may form a tool holder in these illustrative examples. The rod may have a first end and a second end in which the rod may have a first stiffness. A first interface may be located at the first end of the rod in which the first interface may be configured for attachment to a machine. A second interface at the second end of the rod may be configured to hold a tool. The sleeve may have a channel with a first opening at the first end of the channel and a second opening at the second end of the channel. The sleeve may have a second stiffness in which the sleeve may be configured to receive at least a portion of the rod through the first opening and the second opening. The second stiffness may be greater than the first stiffness.

In other advantageous embodiments, an apparatus comprises a sleeve and a number of cutting features. The sleeve may have a first end, a second end, a surface, a channel with a first opening for the channel at the first end of the sleeve, and a second opening for the channel at the second end of the sleeve in which the sleeve is configured to receive at least a portion of a tool holder in the channel. The tool holder may have a first stiffness, and the sleeve may have a second stiffness in which the second stiffness may be greater than the first stiffness. The number of cutting features may be associated with the surface of the sleeve.

In this manner, tool holders with a desired stiffness may be manufactured or ordered with less cost as compared to tool holders made of a single material. For example, with one or more of the different advantageous embodiments, a need to purchase tool holders made of carbide may be avoided when steel tool holders have insufficient stiffness for operations performed on workpieces. The different advantageous embodiments may allow for the use of longer tool holders with greater stiffness. As a result, high rates of metal removal from workpieces may occur as compared to using tool holders made of steel.

Additionally, with one or more of the different advantageous embodiments, costs associated with tools having desired performance parameters may be reduced. With a tool having a channel, the amount of material needed for the tool may be reduced. The tool may be slid onto a rod of a tool holder in which the rod may provide additional stiffening for the tool. In this manner, a desired amount of stiffness may be present during the performance of operations on workpieces.

As a result, the costs for replacing the tool and the times at which the tool may be replaced with a new tool may be reduced.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a tool holder;
   a rod disposed on the tool holder, the rod having a first end and a length, the first end of the rod extending from a surface of the tool holder;
   a sleeve having a first end, a second end, a surface, and a channel with a first opening for the channel extending to the first end of the sleeve and a second opening for the channel extending to the second end of the sleeve in which the channel of the sleeve is attached to the rod by an interference fit so as to substantially cover the length of the rod, in which the tool holder has a first stiffness and the sleeve has a second stiffness in which the second stiffness is greater than the first stiffness; and
   a number of cutting features formed on the surface of the sleeve such that the sleeve and the number cutting features form a cutting tool;
   wherein the rod of the tool holder is comprised of steel and the sleeve is comprised of carbide having metallic properties; and
   wherein the sleeve has a cross section with a shape selected from one of an octagon and a hexagon.

2. The apparatus of claim 1 further comprising:
   the tool holder having the first stiffness in which the tool holder is configured for use with a machine and the channel and rod being substantially cylindrical.

3. The apparatus of claim 2, wherein the tool holder comprises:
   the rod having the first end and a second end in which the rod has the first stiffness;
   a first interface at the first end of the rod in which the first interface is configured for attachment to the machine; and
   a second interface at the second end of the rod in which the second interface is configured to hold the cutting tool.

4. The apparatus of claim 3, wherein the sleeve is configured to be associated with the rod using the interference fit and an adhesive.

5. The apparatus of claim 3,
   wherein an overall stiffness for the rod in the channel of the sleeve is $3(E1I1+E2I2)/L^3$; and
   wherein E1 is Young's modulus for the rod, E2 is Young's modulus for the sleeve, I1 is a cross-sectional inertia for the rod, I2 is a cross-sectional inertia for the sleeve, and L is a length of the rod.

6. The apparatus of claim 2, wherein the sleeve is a first sleeve and further comprising:
   a second sleeve having a first end, a second end, a surface, and a channel with a first opening for the channel at the first end of the sleeve and a second opening for the channel at the second end of the sleeve in which the sleeve is configured to receive at least a portion of the tool holder in the channel, in which the second sleeve has a third stiffness in which the third stiffness is greater than the first stiffness of the tool holder; and
   a second number of cutting features associated the surface of the second sleeve, wherein the first sleeve and the second sleeve are both configured to be secured to a rod for the tool holder at a same time.

7. The apparatus of claim 6,
   wherein the length of the rod is substantially longer than a width of the rod; and
   wherein the number of cutting features of the first sleeve have a spiral configuration, the second number of cutting features of the second sleeve have an angled configuration.

8. The apparatus of claim 1, wherein the number of cutting features associated the surface of the sleeve is a number of curved edges formed on the surface of the sleeve.

9. The apparatus of claim 8, wherein the number of curved edges extends from the first end of the sleeve to the second end of the sleeve.

10. The apparatus of claim 1, wherein the number of cutting features associated the surface of the sleeve is a number of flutes.

11. The apparatus of claim 1, wherein the number of cutting features has a spiral configuration.

12. The apparatus of claim 1, wherein the sleeve is comprised of a material selected from a group comprised of titanium carbide, tungsten carbide, titanium, ziconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, rhondium, a ceramic material, calcium carbide, silicon carbide, a tungsten alloy, osmium, diamond, a rhenium alloy, molybdenum, and composite materials.

13. A tool system comprising:
   a sleeve having a first end, a second end, a surface, and a channel with a first opening for the channel at the first end of the sleeve and a second opening for the channel at the second end of the sleeve in which the sleeve has a cross section of the channel with a shape selected from one of a circle, an octagon, a hexagon, and an ellipse, and in which the sleeve is comprised of a material selected from a group comprised of a carbide having metallic properties, titanium carbide, tungsten carbide, titanium, zirconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, rhondium, a ceramic material, calcium carbide, silicon carbide, a tungsten alloy, osmium, diamond, a rhenium alloy, molybdenum, and composite materials;
   a tool holder in which the tool holder is configured for use with a machine selected from one of a milling machine and a lathe and in which the tool holder comprises:
      a rod having a first end and a second end in which the rod has a first stiffness, in which the rod is comprised of steel, in which the channel of the sleeve is configured to be associated with the rod using one of an interference fit and an adhesive, the sleeve substantially covering the rod such that the first end of the sleeve and the first opening of the channel are proximate the first end of the rod, the sleeve having a second stiffness in which the second stiffness is greater than the first stiffness, and in which an overall stiffness for the rod in the channel of the sleeve is $3(E1I1+E2I2)/L^3$, in which E1 is Young's modulus for the rod, E2 is Young's modulus for the sleeve, I1 is a cross-sectional inertia for the rod, I2 is a cross-sectional inertia for the sleeve, and L is a length of the rod, the sleeve positioned to substantially cover the length of the rod;

a first interface at the first end of the rod in which the first interface is configured for attachment to the machine; and a second interface at the second end of the rod in which the second interface is configured to hold a tool; and a number of cutting features formed on the surface of the sleeve in which the number of cutting features formed on the surface of the sleeve is selected from one of a number of flutes and a number of curved edges formed on the surface of the sleeve in which the number of curved edges extends from the first end of the sleeve to the second end of the sleeve and in which the number of cutting features has a spiral configuration;

wherein the sleeve has a cross section with a shape selected from one of an octagon and a hexagon.

14. A method for performing an operation on a workpiece, the method comprising:

positioning a tool holder and the workpiece relative to each other in which the tool holder is attached to a machine;

placing a sleeve over a rod of the tool holder with an interference fit, the sleeve having a number of cutting features, a first end, a second end, a surface, and a channel with a first opening for the channel at the first end of the sleeve and a second opening for the channel at the second end of the sleeve;

in which the sleeve is configured to substantially cover a rod of the tool holder in the channel along a complete length of the rod; in which the tool holder has a first stiffness and the sleeve has a second stiffness in which the second stiffness is greater than the first stiffness;

in which the number of cutting features is formed on the surface of the sleeve;

in which the rod is comprised of steel and the sleeve is comprised of carbide having metallic properties; and performing the operation using the tool holder with a tool on the workpiece;

wherein the sleeve has a cross section with a shape selected from one of an octagon and a hexagon.

15. The method of claim 14, wherein the performing step comprises:

rotating at least one of the tool holder with the tool and the workpiece; and establishing contact between the tool and the workpiece while rotating the at least one of the tool holder with the tool and the workpiece.

16. The method of claim 14, wherein the operation is selecting from one of a milling operation and a boring operation.

17. The method of claim 14, wherein the rod is substantially cylindrical and has a first end, a second end, and the first stiffness; a first interface at the first end of the rod in which the first interface is configured for attachment to the machine; a second interface at the second end of the rod in which the second interface is configured to hold the tool, and wherein the rod holds the tool, and the channel of the sleeve is substantially cylindrical to engage the rod with an interference fit.

18. The method of claim 14, wherein the number of cutting features extends from the first end of the sleeve to the second end of the sleeve.

19. A method for performing an operation on a workpiece, the method comprising:

positioning a tool holder and the workpiece relative to each other in which the tool holder is attached to a machine;

positioning a sleeve over a rod of the tool holder, the sleeve having a number of cutting features;

in which the sleeve has a first end, a second end, a surface, and a channel with a first opening for the channel extending to the first end of the sleeve and a second opening for the channel extending to the second end of the sleeve;

in which the number of cutting features extends from the first end of the sleeve to the second end of the sleeve and has a spiral configuration;

in which the sleeve substantially covers a rod for the tool holder in the channel with an interference fit;

in which the tool holder has a first stiffness and the sleeve has a second stiffness;

in which the second stiffness is greater than the first stiffness;

in which the number of cutting features is formed on the surface of the sleeve;

in which the tool holder comprises:

the rod having a first end, a second end, and the first stiffness in which the rod holds a tool;

a first interface at the first end of the rod in which the first interface is configured for attachment to the machine;

a second interface at the second end of the rod in which the second interface is configured to hold the tool;

in which the rod is comprised of steel and the sleeve is comprised of carbide having metallic properties; and performing the operation using the tool holder with the tool on the workpiece in which the operation is performed by rotating at least one of the tool holder with the tool and the workpiece and establishing contact between the tool and the workpiece while rotating the at least one of the tool holder with the tool and the workpiece, and in which the operation is selecting from one of a milling operation and a boring operation;

wherein the sleeve has a cross section with a shape selected from one of an octagon and a hexagon.

* * * * *